United States Patent [19]
Sheridan et al.

[11] Patent Number: 5,179,265
[45] Date of Patent: Jan. 12, 1993

[54] COOKING TIME CONTROL SYSTEM FOR CONVEYOR OVENS

[75] Inventors: John J. Sheridan, Holbrook, Mass.; Louis S. Polster, Burbank, Calif.

[73] Assignee: United Electric Controls Company, Watertown, Mass.

[21] Appl. No.: 570,519

[22] Filed: Aug. 21, 1990

[51] Int. Cl.[5] .............................................. H05B 1/02
[52] U.S. Cl. .................................. 219/497; 219/508; 219/388; 219/492; 99/328; 99/443 C
[58] Field of Search ............... 219/492, 497, 506, 508, 219/388, 389; 99/328, 333, 443 C

[56] References Cited

U.S. PATENT DOCUMENTS

| | | | |
|---|---|---|---|
| 4,435,637 | 3/1984 | de Vries | 219/388 |
| 4,461,951 | 7/1984 | Luoma, II et al. | 219/497 |
| 4,587,405 | 5/1986 | Andre | 219/492 |
| 4,610,886 | 9/1986 | Buller-Colthurst | 219/388 |
| 4,803,344 | 2/1989 | Wolf et al. | 219/508 |

Primary Examiner—Mark H. Paschall
Attorney, Agent, or Firm—Wolf, Greenfield & Sacks

[57] ABSTRACT

A control system for processing products in conveyorized ovens. The system monitors and controls the oven temperature and monitors the velocity with which products are moved through the oven. At intervals, the system samples the oven temperature and determines the degree of product processing that has occurred in the sample interval. The system then adjusts the conveyor velocity as a function of the degree of product processing. The system can adjust the effective length of the sample interval as a function of the sensitivity of the product to changes in oven temperature and the difference between the oven set temperature and the actual oven temperature. The system integrates the effective time intervals to determine the total effective time that the product has been processed in the oven. The system is particularly suited to the cooking of food products such as pizzas.

20 Claims, 24 Drawing Sheets $$S1CTF=[1-(EIR1)*(SLOPE\ 224)](K)+[1-(EC1)*(SLOPE\ 220)](1-K)$$
$$P1CTF=[1-(EIR1)*(SLOPE\ 226)](K)+[1-(EC1)*(SLOPE\ 222)](1-K)$$
$$S2CTF=[1-(EIR2)*(SLOPE\ 224)](K)+[1-(EC2)*(SLOPE\ 220)](1-K)$$
$$P2CTF=[1-(EIR2)*(SLOPE\ 226)](K)+[1-(EC2)*(SLOPE\ 222)](1-K)$$
$$S3CTF=[1-(EIR3)*(SLOPE\ 224)](K)+[1-(EC3)*(SLOPE\ 220)](1-K)$$
$$P3CTF=[1-(EIR3)*(SLOPE\ 226)](K)+[1-(EC3)*(SLOPE\ 222)](1-K)$$
$$S4CTF=[1-(EIR4)*(SLOPE\ 224)](K)+[1-(EC4)*(SLOPE\ 220)](1-K)$$
$$P4CTF=[1-(EIR5)*(SLOPE\ 226)](K)+[1-(EC4)*(SLOPE\ 222)](1-K)$$

COMPUTE
COOK TIME FACTOR &
VELOCITY COMPENSATION
FACTORS

EC1=TSC1-T809
EC2=TSC2-T810
EC3=TSC3-T811
EC4=TSC4-T812 where
 TSC1 is the convection product temperature for Zone 0
 TSC2 is the convection product temperature for Zone 1
 TSC3 is the convection product temperature for Zone 2
 TSC4 is the convection product temperature for Zone 3

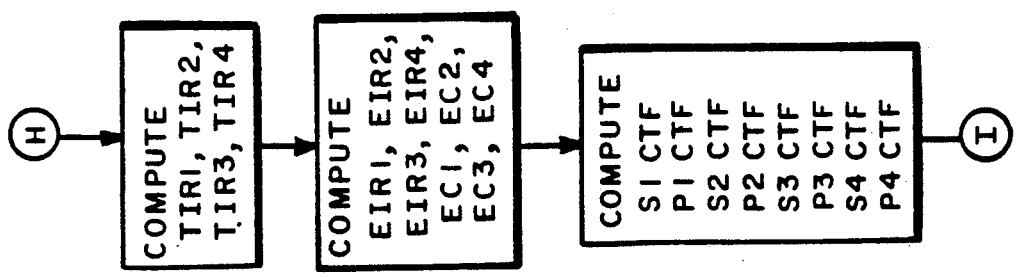

FIG. 25

$TIR1=(T801)(W_a)+(T802)(1-W_a)$
$TIR2=(T803)(W_b)+(T804)(1-W_b)$
$TIR3=(T805)(W_c)+(T806)(1-W_c)$
$TIR4=(T807)(W_d)+(T808)(1-W_d)$

Where
 $W_a$ is weighting factor for Zone 0
 $W_b$ is weighting factor for Zone 1
 $W_c$ is weighting factor for Zone 2
 $W_d$ is weighting factor for Zone 3

EIR1=TSIR1 − TIR1
EIR2=TSIR2 − TIR2
EIR3=TSIR3 − TIR3
EIR4=TSIR4 − TIR4

Where
 TSIR1 is the IR sproduct temperature for Zone 0
 TSIR2 is the IR sproduct temperature for Zone 1
 TSIR3 is the IR sproduct temperature for Zone 2
 TSIR4 is the IR sproduct temperature for Zone 3

COOKING TIME CONTROL SYSTEM FOR CONVEYOR OVENS

BACKGROUND OF THE INVENTION

1. Field of the Invention

The present invention relates generally to heating apparatus and ovens for processing products. More particularly, the present invention relates to ovens which use conveyor systems for processing products by moving a product from an entrance, through the oven, to an exit. The present invention further relates to control systems for controlling conveyorized ovens used to cook food products wherein the temperatures in the oven at which products are being cooked and the time periods during which such products are present and being cooked within the oven are controlled so that when a food product emerges from the conveyorized oven, the food product is properly cooked.

2. Discussion of the Prior Art

Processing of products in a conveyorized oven is a complicated process that may be substantially affected by a number of factors. Processing often consists of more than simply raising a particular product to a specified final temperature. There are many different reactions taking place in a system as complex as food. In food processing, it is desirable to bring the system into a condition that encourages desired reactions to proceed faster than undesired ones. This may require that a food product be maintained at different temperatures for different lengths of time in order to fully complete these various reactions. The requirements of maintaining the product at specified temperatures for certain lengths of time applies to many types of heating and cooling processes, such as heat treating operations, annealing operations and cooking of food products. Different temperatures for varying lengths of time may also be required. Finally, particularly in the case of cooking of food products, there are a number of subjective and objective factors that must be taken into account in order to determine when a particular food product has reached a desired "cooked" or "done" state. For example, before a particular food product may be considered to be "done" or "cooked", the food product may have to have a certain color, consistency, crunch and interior surface or exterior surface temperature.

In order to cook products to the desired "cooked" or "done" state, an oven is used in which heated air is injected into the oven cavity from a suitable heat source via one or more input heat ports, often in the form of hot air jets. A conveyor system is also included which moves the product past each of the hot air jets successively so that when the product exits the oven it is properly "done" or "cooked". In conveyor ovens, the input heat ports may be located in structure known in the art as "fingers", which are positioned at various locations above and below the conveyor. Heated air exits from these heat ports and is directed towards the top and bottom of the product respectively. The hot air fingers are arranged within the oven to provide a predetermined distribution of hot air jets within the oven.

In the prior art, the temperature of the oven cavity is controlled by positioning a temperature sensing element at a selected location within the heated air planium in the oven. In a conventional conveyor oven, the location of the temperature sensing probe is either at or near the entrance end of the oven. The temperature measured by the temperature sensing element is used to thermostatically control the temperature of the oven so that the sensed temperature in the oven can be maintained at a preset temperature value. Temperature control is generally accomplished by turning a heat source (which may be either a gas burner or an electric heater) on to increase the temperature of the oven or off to allow a decrease in the temperature of the oven.

The cooking time for a particular product, that is, the time which the product has to remain in the oven in order to reach the proper "done" or "cooked" state, depends on the temperature of the oven, the type of product which is being cooked, and the degree of cooking required in order to reach the "done" condition. With a conveyor type oven, assuming the temperature of the oven remains constant at a preset temperature, the cooking time is determined by the speed of the conveyor as it moves the product through the oven. Under normal circumstances, the user of a conveyor oven sets the oven at the desired preselected temperature, and then sets the conveyor speed so that the food product remains in the oven, i.e., the product proceeds from the entrance to the exit in the preselected cooking time. The conveyor remains at the selected constant speed so that the food product moves through the oven for the preset cooking time.

There are several problems with this type of prior art conveyorized oven. These problems fall mainly into two categories: oven temperature control, particularly due to variations in the load placement through the oven, and conveyor speed control.

The prior art thermostatic temperature control system is generally not able to maintain the oven temperature at the preset temperature for several reasons. First, the placement of the thermostatic temperature control cannot sense the uneven loading of the oven. Second, the thermodynamics of the oven result in uneven temperatures due to the uneven loading Second, as noted earlier, the oven itself may have some hysteresis with respect to temperature changes within the oven cavity due to thermal inertia and thermal mass of the oven components themselves.

In some cases, the heat or air distribution within the oven may be purposely selected to be non uniform. For example, in a conveyor oven, a greater number of hot air jets may be desired in the first half, or entrance zone of the oven and a lesser number of hot air jets may desired in the second half, or exit zone of the oven. The input hot air jets can be appropriately arranged in the oven so as to provide the desired non-uniform air distribution profile by locating additional "fingers" in the entrance zone of the oven. Because of variations in the airflow which occur and because only a single temperature sensor, which is normally located at the entrance end of the oven is used, a desired non-uniform temperature profile results.

The non uniform temperature profile is affected by changes in the heat load placed on the oven due to the quantity and types of products inserted at the entrance end of the oven. Furthermore, since conventional ovens generally have only a single temperature sensor located in the entrance zone of the oven, temperature control of the oven cannot follow the load as it is moved through the oven. The effect of such load changes and temperature control produces adverse results in the final cooked product at the exit zone of the oven. For example, suppose a product representing a relatively heavy thermal load is inserted at the entrance end of the oven, thereby requiring a higher energy in the entrance zone than would be required for more even or idling thermal loads. In order to compensate for the high thermal load, the control system will add more energy to the heated air being injected into the entrance zone which will result in a corresponding rise in the temperature of the heated air being injected into the exit zone because there is a light load in the exit zone. A product that was moving through the oven and is in the exit zone when this temperature rise occurs may, as a result of this increase in temperature, become overcooked or over browned. Conversely, when a product is located in the exit zone of the oven and no product is located in the entrance zone, the oven will reduce the energy supplied to the oven cavity despite the thermal load in the exit zone. Therefore, the product may emerge undercooked.

A fourth problem with this prior art temperature control system is that the thermal load on the oven may adversely affect the degree to which food products are cooked. For example, if food products representing a very high thermal load were placed on the conveyor which moves through the oven at a constant speed, and in combination with the lag time of the oven, the temperature control system may not be able to compensate initially for the high thermal load and consequently, the food products would emerge at the end of the conveyor from the oven in an undercooked state.

There is another set of problems with prior art conveyorized ovens and control systems due to the control of the conveyor system. A first problem occurs because the conveyor speed does not change with different products having different cooking time requirements. The conveyor speed is generally manually set by the operator to a fixed speed. Therefore, with the oven set at a fixed temperature, and the conveyor speed set so that a product moves through the oven in a particular time, products which require less than the preset time for proper cooking will be over done while products which require more time or a higher temperature than the preset time and temperature will be underdone.

Another problem occurs in other prior art oven conveyor systems in which the conveyor speed through the oven cannot be adjusted and is constant and independent of the temperature of the oven. If the oven temperature should happen to be low, a product will not spend enough time in the oven to be fully cooked and consequently will emerge in an undercooked state. On the other hand, if the oven temperature is too high, a product may remain in the oven too long and emerge at the exit end of the oven in an overcooked state.

Moreover, not only are these prior art conveyorized ovens unable to be adequately controlled to compensate for variations in cooking temperatures and heat distribution that occur during the cooking process for a particular product, they are unable to compensate for the variations in the cooking process required when the oven is to be used for cooking different types of products. This problem is particularly acute when different types of products are cooked at the same time. The oven is unable to compensate for different products which react with different sensitivities to temperature variations within the oven. This problem is especially aggravated when cooking different types of food products in conveyorized ovens.

Further, conveyor cooking devices rely on the length of the contained device to increase the throughput. Conveyor cooking devices tend to be large in order to accomplish high throughput. The smaller to normal size devices have two zones that require separate sets of sensors in order to measure the temperature. Longer conveyor cooking devices have multiple heat source and more zones that need to be accounted for in order to accurately control cooking. In these conventional ovens, a single heat sensing means placed within the oven chamber does not give enough information about the temperature of the impingement or convected air or enough information about the energy removed from that air on average within a zone. Consequently, accurate sensing and control of the oven temperature and resultant cooking times is difficult. Furthermore, infrared type ovens only control the temperature of the radiant element and do not take into account ambient temperature changes due to variation of the load, thus further contributing to inaccurate cooking.

Therefore, an object of the present invention is to provide a method and apparatus for cooking products of differing types or cooking times so that all products, when cooked in the oven are cooked to the proper "done" or "cooked" state.

Another object of the present invention is to provide a method and apparatus that accurately compensates for changes in oven temperature during the cooking process.

Another object of the present invention is to provide a method and apparatus that compensates for temperature fluctuations and accurately controls the cooking time of a particular product.

Another object of the present invention is to provide a method and apparatus that accurately compensates the cooking time of a particular product as a function of the oven temperature and the sensitivity of the particular product to changes in oven temperature.

Another object of the present invention is to provide a method and apparatus for cooking food products of differing types so that all food products of the same type are uniformly cooked to the same "cooked" state.

Still another object of the present invention is to provide a method and apparatus for uniformly cooking different food products that may be operated by people having a wide range of skill levels.

Another object of the present invention is to provide a method and apparatus that compensates the temperature control due to load variations within the oven.

SUMMARY OF THE INVENTION

The foregoing and other objects and advantages of the present invention are achieved in a method and an oven and control system therefore that calculates the total time a product has been in the oven as a function of the oven temperature and the sensitivity of the product to changes in oven temperature. The present invention samples the oven temperature at intervals and adjusts the processing or cooking time between samples as a function of the difference between the actual oven temperature and a predetermined product temperature. The system integrates the adjusted processing or cooking times until the total integrated processed or cook time that the product has been in the oven equals the desired preset processing or cooking time at which time the product has reached the proper processed or "cooked" state.

The present invention additionally ensures that all products of the same type are uniformly processed or cooked to the same desired processed or "cooked" state.

The foregoing and other objects, features, and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the Drawings,

FIG. 20 is a flow chart illustrating the method of calculating the present conveyor speed and incremental adjusted cook times (IACT) carried out in the infrared oven of FIG. 17;

FIGS. 25 and 26 include a flow chart illustrating the method of computing new cook time factors and velocity compensation factors carried out in the infrared oven of FIG. 17.

DETAILED DESCRIPTION

For purposes of illustration only, and not to limit the general applicability of the method and apparatus of Applicants' invention, the operation of the present invention will now be explained with reference to its use in a method and apparatus for cooking pizzas of two different types, screen pizzas and pan pizzas. A screen pizza generally has a thin crust while a pan pizza generally has a thicker crust and uses a different type dough than that used in a screen pizza. However, although the present invention will be explained with respect to its use in a conveyorized oven of the type made and sold by the Middleby Marshall Company, Morton Grove, Ill. under the Models PS 310/350/360S, one skilled in the art will recognize that the method and apparatus of the present invention may be used in the same oven or in different types of ovens for cooking a wide variety of food products. Further, one skilled in the art will appreciate that the method and apparatus of the present invention can be applied to other types of processes which use conveyorized ovens in which the time in the oven and the temperature of the oven need to be controlled, such as heat treating processes or annealing processes.

Figure 1:
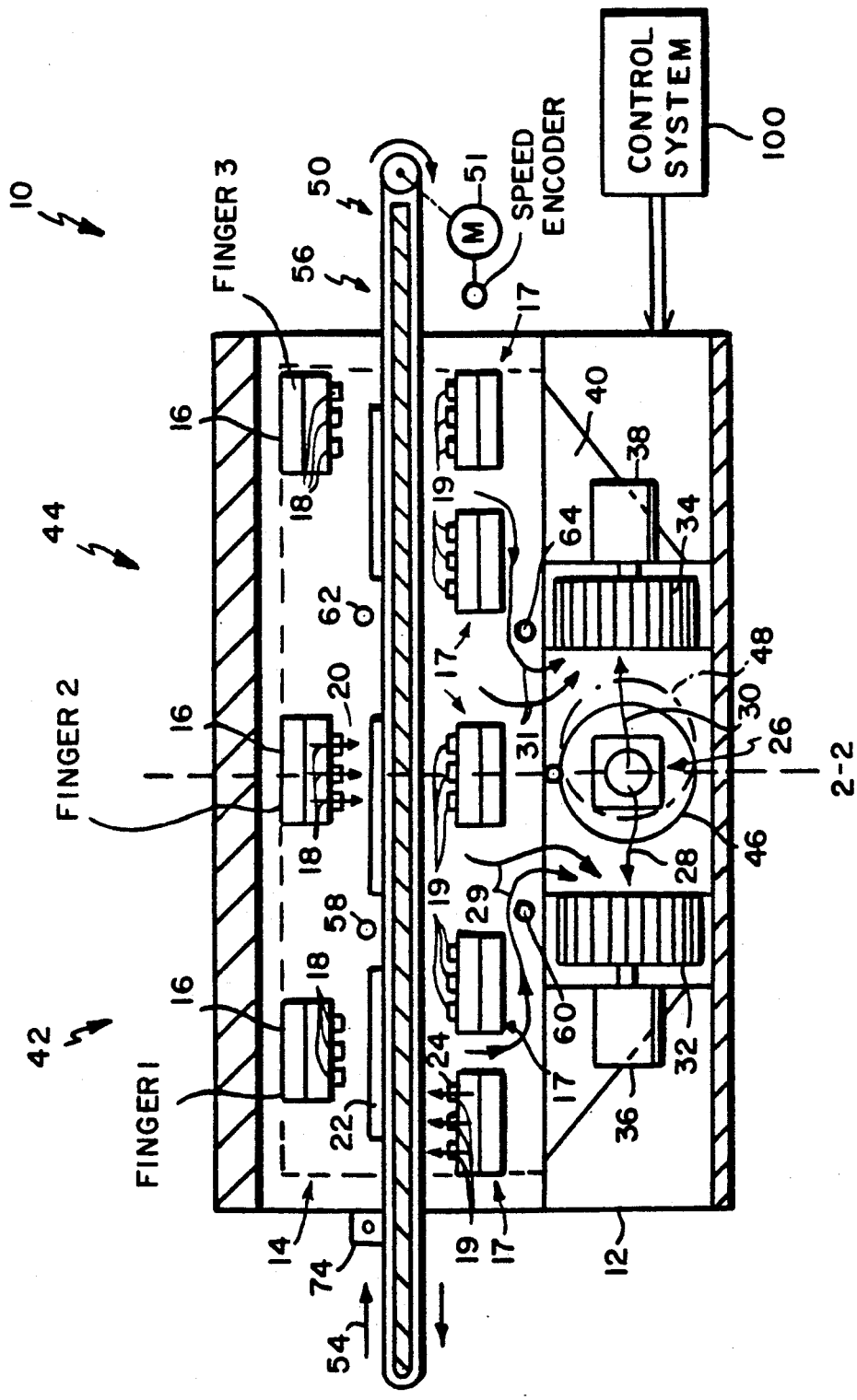
FIG. 1 is a cross sectional view of an oven employing the present invention taken along a line parallel to the motion of food products through the oven.

Reference is now made to FIG. 1 which figure illustrates a conveyorized oven which may be used to cook a variety of food products, such as pizzas. The oven 10 includes a housing 12 which encloses the oven cavity 14, heat source 26, conveyor 50, temperature probes 58, 60, 62 and 64 and circuit 100. Within the oven cavity are hot air jets or "fingers". In this exemplary oven, there are three fingers 16 in the top of the oven which direct the heated air through outlets 18 along the direction of arrows 20 towards food product 22. There are also five bottom fingers 17 which direct heated air out of outlets 19 along the direction of arrows 24 towards the bottom of food product 22. The invention is not limited to this particular oven configuration, there may be as many fingers as needed and the fingers may be located in any arbitrary position within the oven depending on the cooking results desired.

Heated air for hot air fingers 16 and 17 is provided by heat source 26 which may be a gas burner, an electric heater or any other suitable heat source. Heated air from heat source 26 is directed along the directions indicated by arrows 28 and 30 towards impellers 32 and 34 respectively. Impellers 32 and 34 are driven respectively by motors 36 and 38 which impellers transmit the heated air through plenum chamber 40 to hot air fingers 16 and 17. The heated air flows into oven cavity 14 and returns to heat source 26 along the direction of arrows 29 and 31 for reheating.

Oven 10 is additionally divided into an entrance zone 42 and an exit zone 44. An overall temperature differential between the entrance zone 42 and the exit zone 44 may be achieved using balance baffle 46. If a higher temperature is desired at the entrance zone of oven 10, balance baffle 46 is adjusted so as to direct a larger volume of heated air to impeller 32 and then to the hot air fingers in entrance zone 42 of the oven. On the other hand, if a higher temperature is desired at the exit zone 44 of oven 10, balance baffle 46 would be adjusted so as to direct a larger volume of heated air to impeller 34 and then to the fingers in the exit zone 44 of oven 10. In the exemplary oven illustrated in FIG. 1, balance baffle 46 is shown adjusted (by broken line 48) to direct more heated air towards the exit zone of oven 10.

Figure 4:
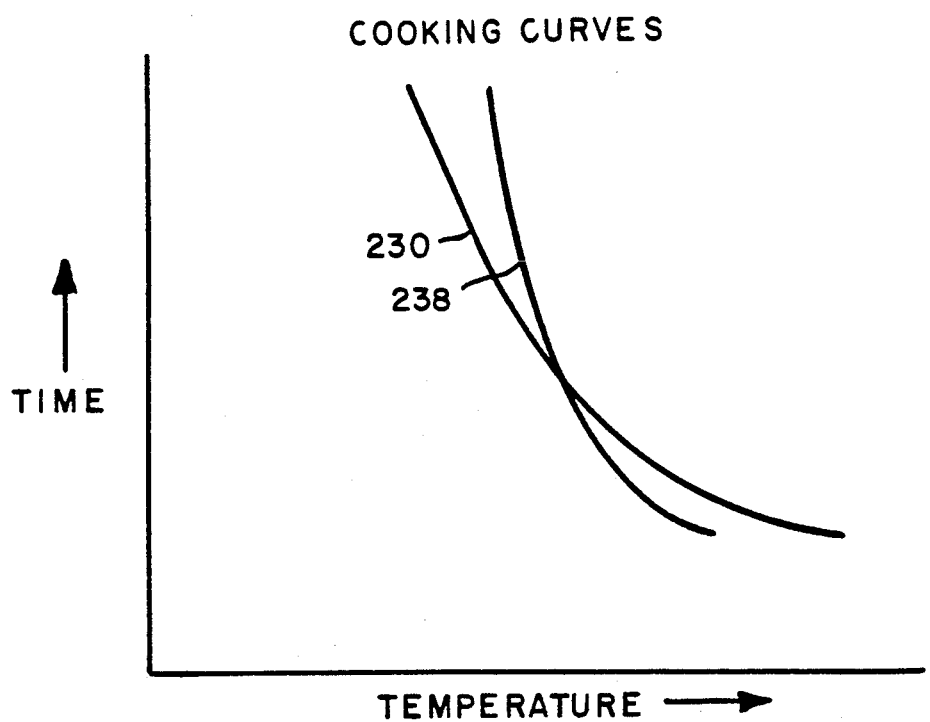
FIG. 4 is a graph illustrating the relationship between oven temperature and cooking time for new food products.

To move the food products 22 through oven 10, a conveyor 50 is provided which is driven by a motor 51. Food products are transported through oven 10 by placing them on conveyor 50 at the entrance area 52 of the oven. Conveyor 50 moves the products along the direction of arrow 54 through the oven cavity 14 so that the food products emerge onto the exit area 56 of oven 10 where they are then removed by an operator. Although a continuous belt type conveyor is illustrated in FIG. 4, the present invention is not so limited. Conveyor 50 may also be a walking beam, rotating disk, or "ferris wheel" type of conveyor.

To control the temperature in oven cavity 14, four temperature probes 58, 60, 62, and 64 are provided to feed sensed temperature data to a control system, which will be explained in greater detail hereinafter, for controlling heat source 26. Temperature probes 58 and 60 are located in the entrance zone 42 of oven 10. Temperature probes 62 and 64 are located in the exit zone 44 of the oven. Temperature probe 58 and temperature probe 62 are located in hot air plenum 40 (see FIG. 2) so that temperature probes 58 and 62 sense the temperature of the heated air being supplied to fingers 16 and 17. Temperature probes 58 and 62 are therefore source temperature probes. Temperature probes 60 and 64 are located to sense the temperature of the oven air being returned to heat source 26 for reheating (See FIG. 2). Temperature probes 60 and 64 are therefore return temperature probes. Temperature probes 60 and 64 are located in the direct path of the air returning to the heat source but are also located so as not to receive any air flow from the oven fingers or direct radiation from the heat source. This placement results in more accurate and stable sensed temperatures. Furthermore, the signals from the temperature probes are given empirically determined weights when used to determine the overall temperature of the oven. These weighting factors and their use in determining oven temperature and control thereof will be explained in greater detail later on.

In the exemplary oven of FIG. 1, four temperature sensing probes have been illustrated, however, the present invention is not so limited. A greater or lessor number of temperature probes may be incorporated into the present invention depending upon the size of the oven and the numbers at zones and heat sources need for the accuracy with which oven temperature is to be controlled, the sensitivity of particular food products to changes in overall oven temperature, and characteristics of particular ovens in which the present invention is utilized. Furthermore, the location of the temperature probes, as shown in FIG. 1, has been found to be preferred for cooking of pizzas in the exemplary oven described herein. However, the temperature probes may be placed in other locations to sense other temperatures in the oven or in other locations to detect the source and return air temperatures, as required by the particular demands of the oven being used and the products being processed.

Oven 10 also includes optical sensor 74, which may be a light emitting diode type of sensor. Optical sensor 74 is used to detect when a product actually begins entering the oven cavity 14.

Figure 2:
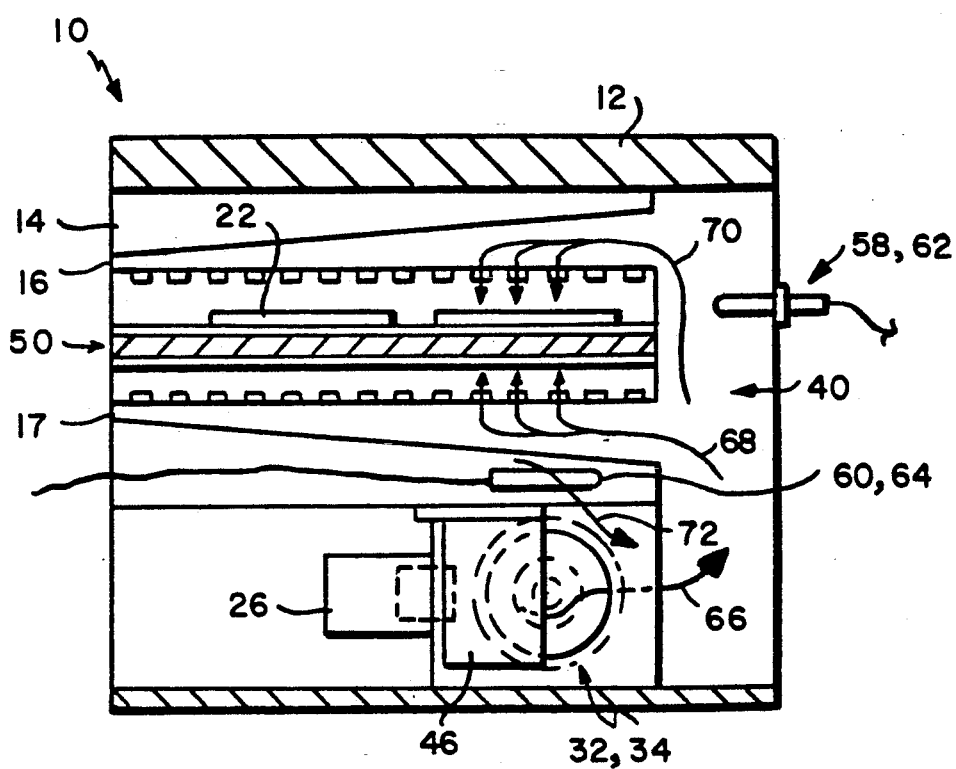
FIG. 2 is a cross sectional view of the oven of FIG. 1 taken along a line 2—2 of FIG. 1 which is perpendicular to the motion of food products through the oven.

Reference is now made to FIG. 2 which is a cross sectional view of oven 10 illustrated in FIG. 1 taken along a line 2—2 of FIG. 1 in a direction perpendicular to the motion of conveyor 50 as illustrated by arrow 54. As shown in FIG. 2, conveyor 50 is sized to allow multiple food products, such as pizzas, to be placed in the oven 10 and cooked simultaneously.

FIG. 2 also illustrates the flow of heated air within oven 10. Heated air, generated by heat source 26 is directed by impeller 32, 34 along the direction of arrow 66 into hot air plenum 40. Heated air is directed along arrows 68 and 70 into lower air fingers 17 and upper air fingers 16 respectively. Temperature probe 58, 62 senses the temperature of the hot air being directed towards food product 22. After the hot air exits from fingers 16, it enters oven cavity 14 and returns along the direction arrow 72 to heat source 26 for reheating and recirculation within the oven. Temperature probe 60, 64 is used to sense the temperature of the air that is returning from oven cavity 14 to heat source 26.

Figure 3:
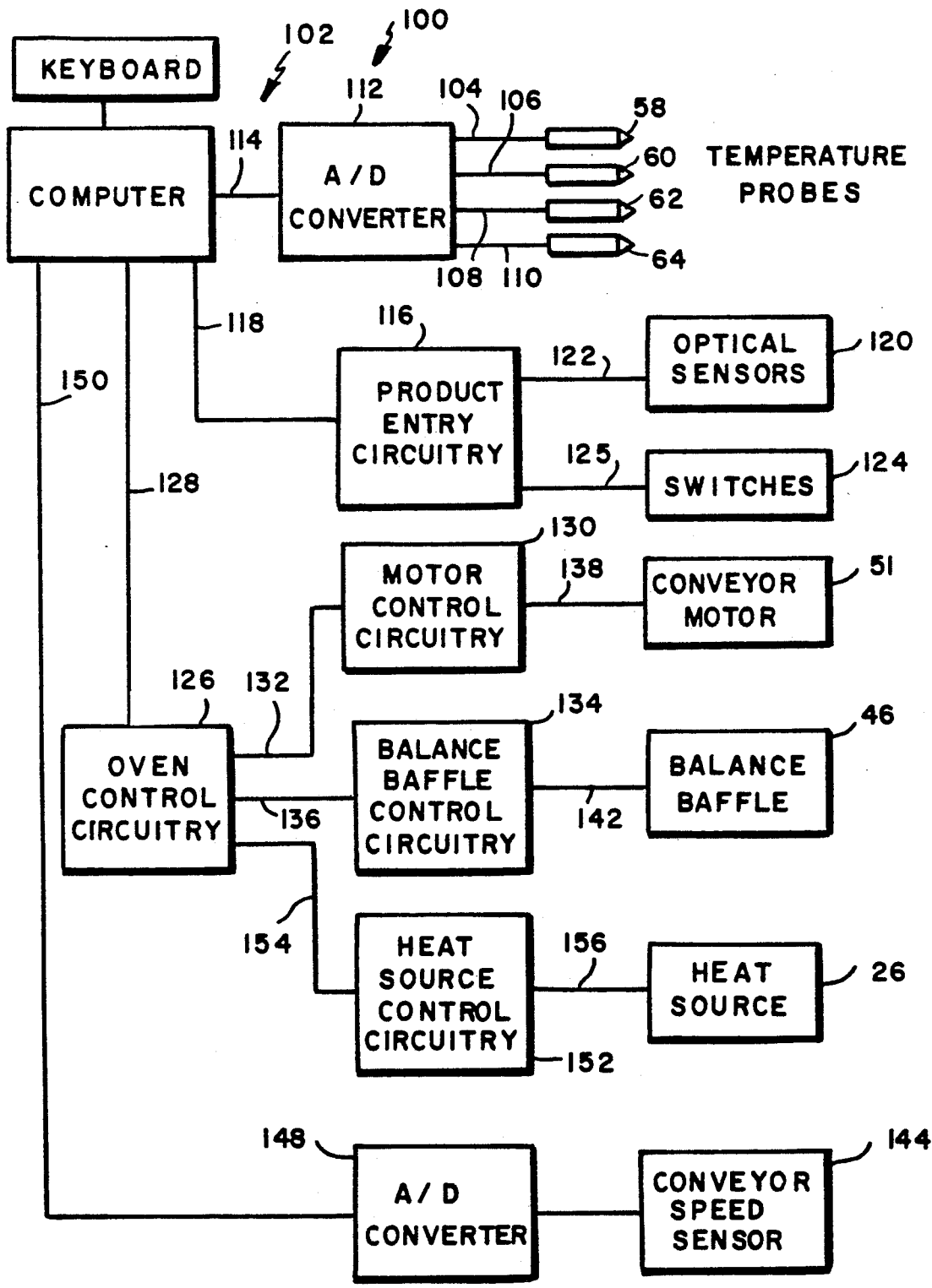
FIG. 3 is a schematic block diagram of an illustrative computer control system which may be used to carry out the method of the present invention in the oven illustrated in FIG. 1.

Reference is now made to FIG. 3 which shows, in block diagram form, an exemplary system which may be used to carry out the functions of the present invention. Circuit 100 includes a computer 102, product entry circuitry 116, analog to digital converters 112 and 148, oven control circuitry 126, heat source control circuitry 152, conveyor speed sensor 144, balance baffle control circuitry 134, and motor control circuitry 130. Computer 102 includes at least a central processing unit and associated memory for processing data according to the method of the present invention.

Temperature probes 58, 60, 62, and 64 send analog data via respective connections 104, 106, 108, and 110 to analog to digital converter 112. analog-to digital converter 112 transforms the data from an analog format into digital format so that the data can be transmitted via connection 114 to computer 102 for processing. Temperature probes 58, 60, 62, and 64 sense the temperature of the oven at various locations, as previously described.

Circuit 100 additionally includes product entry circuitry 116 connected to computer 102 via connection 118. Optical sensors 120, which include at least optical sensor 74, supply data to product entry circuitry 116 via connection 122 indicating the presence or absence of a food product in the entrance zone to the oven. Switches 124 supply data via connection 125 to product entry circuitry 116. Switches 124 may be used by the operator of the oven to indicate different types of food products being placed into the oven for cooking. In this case, each switch in the plurality of switches 124 corresponds to a different type of food product being placed in the oven. During operation of the oven, the operator presses one of the switches 124 indicating the type of food product being placed in the oven. For example, a switch may be labeled "screen pizza". When the "screen pizza" switch is pressed, product entry circuitry 116 sends a signal to computer 102 indicating that a screen pizza has been placed in the oven and therefore computer 102 initiates a screen pizza cooking program. In another example, a pan pizza may be placed in the oven for cooking. Therefore, the user presses a different switch in the plurality of switches 124 labeled, for example, "pan pizza". Thereafter, product entry circuitry 116 sends a signal to computer 102 indicating that a pan pizza has been placed in the oven for cooking. Computer 102 then initiates a pan pizza cooking program. The function of product entry circuitry 116 is to provide any interface functions necessary so that computer 102 may receive the data from optical sensors 120 and switches 124 in the proper format for processing. The oven operator may additionally manually inform the oven control system that a product has entered the oven by pressing another one of the plurality of switches 120 which switch performs the same function as optical sensors 120.

In another embodiment of the invention, switches 124 may be replaced with an automatic optical or mechanical sensor which determines the type of product being placed in the oven. For example, by sensing the different types of cooking utensils used for different products, the sensor informs product entry circuitry 116 of the type of product being placed in the oven. Therefore, the oven operator is relieved of having to manually enter this information, thus increasing productivity and at the same time avoiding the situation where a food product has gone into the oven and no product switch was pressed.

Circuit 100 additionally includes oven control circuitry 126 which receives control signals from computer 102 via connection 128. Oven control circuitry 126 performs any necessary interface functions, such as digital-to-analog conversion of the signals from computer 102 and thereafter supplies control signals to motor control circuitry 130 via connection 132 and additional control signals to balance baffle control circuitry 134 via connection 136. Motor control circuitry 130 supplies appropriate signals over connection 138 to control the speed of conveyor motor 51 which in turn controls the speed of conveyor 50. Balance baffle control circuitry 134 supplies appropriate signals over connection 142 to balance baffle 46 in order to control the distribution of heated air within the oven. Heat source control circuitry 152 is also provided which receives control signals from oven control circuitry 126 via connection 154. Heat source control circuitry 152 supplies appropriate signals over connection 156 to heat source 26 in order to turn heat source 26 on or off to control the oven temperature.

Circuit 100 also includes conveyor speed sensor 144 which may be of any appropriate configuration that is effective to sense the speed of conveyor 50. A signal from conveyor speed sensor 144 is transmitted via connection 146 to analog to digital converter 14B. Analog to digital converter 148 converts the analog signal generated by conveyor speed sensor 144 to a digital format and thereafter transmits this digital signal to computer 102 via connection 150. These signals are then used by computer 102 to control the speed of conveyor motor 51 and to keep track of the position of pizzas within the oven. Thus, the conveyor speed control is a closed loop system resulting in more accurate control of the speed of conveyor 50.

Prior to operating the oven of the present invention, several initial parameters concerning the type of product to be cooked, the time in which the cooking is to take place, the desired "cooked" state of the product must be established, and the products cooking time variations due to changes in cooking temperature. These parameters are determined empirically as will now be explained in detail.

Reference is now made to FIG. 4, which FIG. depicts a couple of "processing curves" or "cooking curves" for a variety of food products. A "cooking curve" describes the relationship between actual oven temperature and cooking time for a particular food product. The abscissa of the graph in FIG. 4 represents temperature in degrees Fahrenheit. The ordinate of the graph in FIG. 4 represents time in seconds. All cooking curves have the same general shape described by the equation $y=1/x$. The actual cooking curve is determined empirically by cooking the product at a "low" temperature (but a temperature that is high enough to actually cook the product) to establish a low temperature endpoint. The product is then cooked at a "high" temperature to establish a high temperature endpoint. The "high" temperature is generally an "ideal" temperature which provides the best results, i.e. color, texture, and temperature. The two endpoints are connected by a curve approximately described by the equation $y=1/x$.

Cooking curve 230 is a cooking curve for a food product such as biscuits. Cooking curve 238 in FIG. 4 is a cooking curve for a food product such as bacon. Each different type of product will have its own distinct cooking curve. Furthermore, the cooking curves are dependent on the type of cooking utensil in which the product is cooked. Different cooking utensils have different heat transfer characteristics which directly affect the cooking time sensitivity of the product to changes in temperature cooking time of the product.

Figure 5:
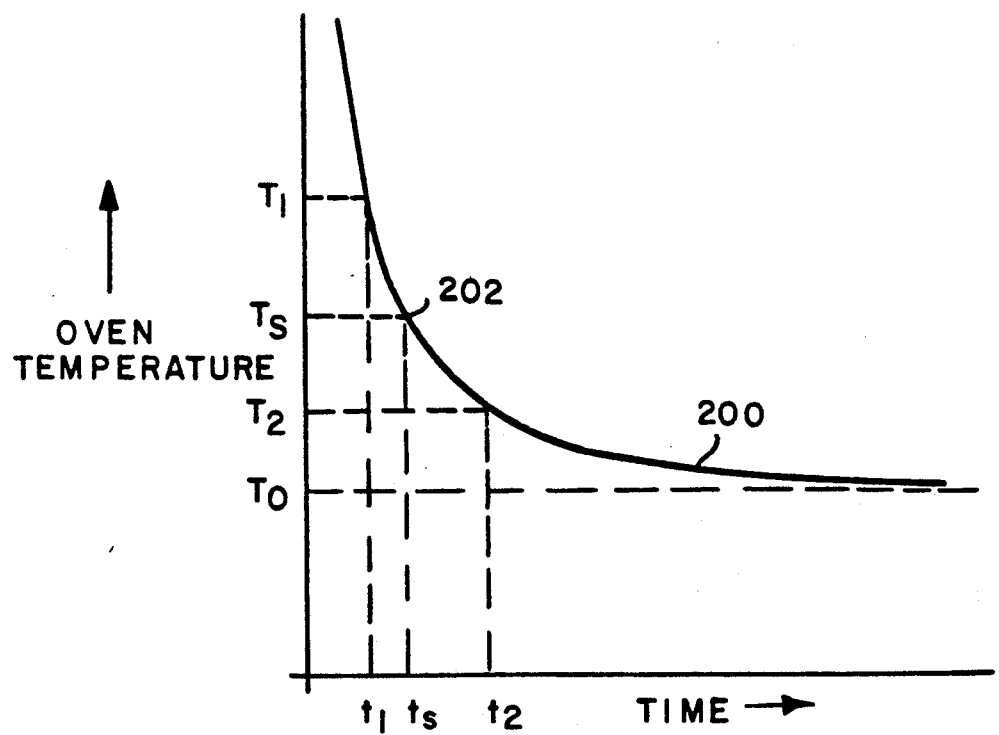
FIG. 5 is a graph illustrating the relationship between oven temperature and cooking time for a screen pizza.

Reference is now made to FIG. 5 which depicts a "cooking curve" for a screen type of pizza. The ordinate of the graph in FIG. 5 represents oven temperature. The abscissa of the graph in FIG. 5 represents time. Cooking curve 200 is determined empirically as described previously. A set point is then determined by selecting a cook time interval and a product set temperature which gives a food product, in this example, a screen pizza, the desired "cooked" state in the desired time. In the particular case of pizza, determining when the pizza is done is based on a subjective and objective determination which includes such factors as the color of the top and the color of the bottom of pizza, the crunch of the crust, and whether or not the cheese has melted. Once a desired product set temperature $T_s$ (in appropriate units such as degrees Fahrenheit) has been established and a corresponding cooking time interval $t_s$ (in appropriate units such as seconds) has been determined, a set point 202 may be determined. The set point is the product set temperature and time interval which results in the pizza being properly cooked in the desired time, also assuming that the oven temperature remains constant. Thereafter, the temperature of the oven is varied from the product set temperature and a time interval required to cook the pizza to the same "cooked" state is measured. When all of the empirically determined temperature and time points are plotted in relation to the product set temperature $T_s$ and the cooking time interval $t_s$, a curve 200 results.

Temperature $T_o$ is an offset temperature below which no appreciable cooking of the pizza occurs. Therefore, the oven temperature has to be greater than $T_o$ in order to adequately cook a screen pizza. By examining curve 200, it may be seen that if the oven temperature rises to a temperature $T_1$ which is higher than the product set temperature $T_s$, the cooking time of the pizza decreases to a time interval $t_1$. On the other hand, if the oven temperature drops below the product set temperature to a temperature such as $T_2$, the cooking time of the pizza needed in order reach the same "cooked" state increases to a time interval $t_2$.

It should be noted at this point that the cooking time of a particular product cannot be always decreased by increasing the oven temperature. There are a number of limitations on the time interval and oven temperature. For example, in the case of pizzas, in order to properly cook a pizza, the cooking time has to allow for the dough reactions to occur, rising of the dough, and cooking of the crust. In addition, if the temperature is raised too high, the toppings which may be on the pizza are burned before being cooked.

Curve 200 may be described by the following equation:

$$K = (T)(t^n) \quad (601)$$

where
n = 1
t = actual measured cooking time (in appropriate units such as seconds)
T = actual measured oven temperature (in appropriate units such as degrees Fahrenheit)
$K = (T_s)(t_s)$ Since $T_o$ may be considered to be just an offset temperature, the following substitution into equation 601 may be made:

$$(T_s - T_o)t_s = (T - T_o)t \quad (602)$$

where
$T_o$ = oven offset temperature
$T_s$ = product set temperature
$t_s$ = set cooking time.

Taking the derivative of any point on curve 200 with respect to temperature and dividing it by the derivative of the set point 202 of curve 200 with respect to temperature gives the following relationship:

$$-\frac{\frac{dt}{dT}}{\frac{dt_s}{dT_s}} \quad (603)$$

where $\frac{dt}{dT}$ is the derivative of any point on curve 200 with respect to temperature $\frac{dt_s}{dT_s}$ is the derivative of the set point on curve 200 with respect to temperature Therefore, the change in cooking time of a particular food product, such as pizzas in this example, is the ratio of the derivative with respect to temperature of curve 200 at any measured time interval to the derivative with respect to temperature of the set point 202:

$$\frac{\frac{dt}{dT}}{\frac{dt_s}{dT_s}} \quad (604)$$

Figure 6:
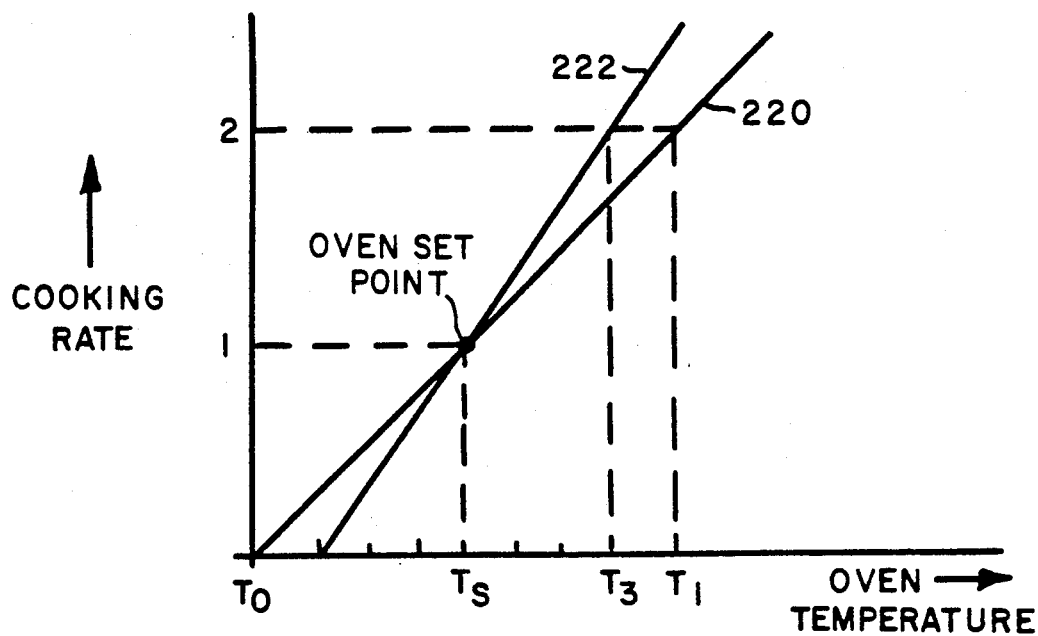
FIG. 6 is a graph illustrating the relationship between oven temperature and the cooking rate for a screen pizza a pan pizza.

From equation 604, a Product Sensitivity Value curve may be determined as illustrated in FIG. 6.

Referring now to FIG. 6, there is shown a graph representing a "product processing" or "cooking rate curve." A cooking rate curve describes the relationship between changes in oven temperature from the product set temperature and the rate at which a product cooks. Curve 220 is determined by plotting the ratio of derivatives of expression (604) for a number of temperature variations around the oven temperature set point. The abscissa of the graph in FIG. 6 represents the oven temperature, while the ordinate in the graph in FIG. 6 represents the cooking rate. Furthermore, cooking rate curve 220 has been normalized by subtracting the offset temperature to, so that cooking rate curve 220 intersects the origin of the graph in FIG. 6.

Examining cooking rate curve 220 in more detail, it will be seen that the cooking rate is 1 when the oven temperature is $t_s$. That is, when the oven temperature is set at $t_s$, and assuming the oven temperature does not vary, the screen pizza will cook in the desired interval $t_s$. If it was desired to double the rate at which the pizza was cooked, the oven temperature would have to be raised to $t_1$. Thus, the change in oven temperature ($\Delta x$) that corresponds to a doubling of the cooking rate ($\Delta y$) is the Product Sensitivity Value for a particular food product. We discovered by experimentation that the cooking curve of a product is dependent on the type of cooking utensil used, the Product Sensitivity Value will also be cooking utensil dependent.

Also illustrated in FIG. 6 is an additional cooking rate curve 222. Curve 222 is a cooking rate curve for a different type pizza, namely a pan pizza. Cooking rate curve 222 is derived from an empirically determined cooking curve similar to the curve illustrated in FIG. 5. The slope of cooking rate curve 222 is $1/T_3 - T_s$ which is greater than the slope of curve 220 which is $1/T_1 - T_s$. It can also be seen by inspection that the Product Sensitivity Value of a pan pizza as given by curve 222 is $T_3 - T_s$. Therefore, since the slope of cooking rate curve 222 is greater than the slope of cooking rate curve 220, the cooking time of a pan pizza is more sensitive to changes in oven temperature than the cooking time of a screen pizza. Therefore, the smaller a particular food Product Sensitivity Value is, the more sensitive the particular product's cooking time will be to changes in oven temperature.

This can be shown mathematically from the following derivation. Starting with equation (602):

$$(S_s - T_o)t_s = (T - T_o)t \quad (602)$$

where
$T_o$ = oven offset temperature
$T_s$ = product set temperature
$t_s$ = set cooking time
t = actual cooking time.

From FIG. 5 it will also be seen that the Product Sensitivity Value may be alternatively defined as the product set temperature ($T_s$) minus the oven offset temperature ($T_o$):

$$PSV = T_s - T_o \qquad (605)$$

Substituting equation (605) into equation (602):

$$t = \frac{PSV}{T - T_o} t_s \qquad (606)$$

Using equation (605) again, an additional substitution for $T_o$ can be made in equation (606):

$$t_s = \frac{PSV}{T - T_s - PSV} t \qquad (607)$$

Equation (607) may be alternatively expressed in the form:

$$t = 1 - \frac{\epsilon}{PSV} t_s \qquad (608)$$

where $\epsilon = T_s - T$

From equation 608, the relationship between changes in oven temperature and the effect upon the cooking time of a food product is clearly illustrated. For example, suppose that a screen pizza is being cooked. The screen pizza has a Product Sensitivity Value of $T_1 - T_s$ and a desired cooking time of 300 seconds (5 minutes), for example. If there is no error in the temperature of the oven from the oven set temperature, using equation (608), it can be seen that the actual cooking time t equals the desired or set cooking time $t_s$. If there was an error of $+10°$ ($T_s - T$) in the oven temperature from the product set temperature, then by substituting 10 for $\epsilon$ in equation (608), the actual cooking time will change by a factor of 0.8. Consequently, the actual cooking time will decrease to 0.8 multiplied by 300 seconds or 240 seconds. On the other hand, suppose the oven temperature was 10° less than the oven set temperature ($T_s - T = -10$). Substituting $-10$ for $\epsilon$ in equation (608) shows that the actual cooking time will increase by a factor of 1.05. Consequently, the actual cooking time will be 1.05 multiplied by 300 seconds (the desired or set cooking time) or 315 seconds.

Figure 7:
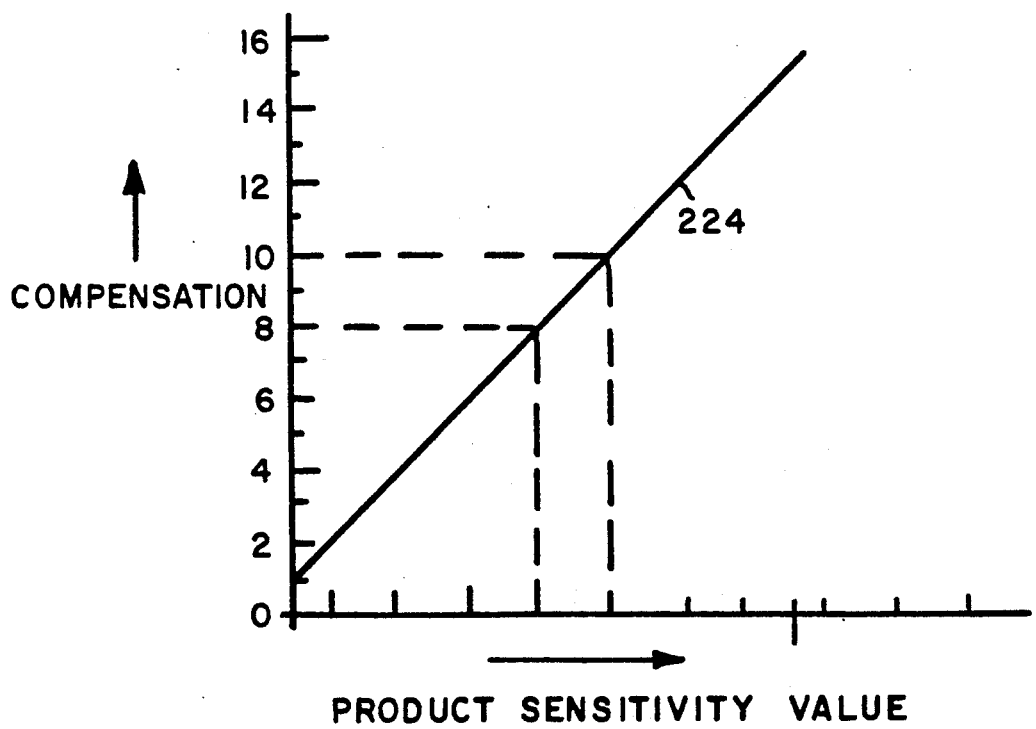
FIG. 7 is a graph illustrating the relationship between the Product Sensitivity Values illustrated in FIG. 6 and a normalized compensation value scale for a variety of food products.

Once the Product Sensitivity Values have been determined for a number of different food products, a graph as illustrated in FIG. 7 may be developed. Referring now to FIG. 7, there is shown a compensation number curve 224. A compensation number curve describes an arbitrary relationship between Product Sensitivity Values and an arbitrary compensation scale which has been found to be useful by oven operators. The abscissa of the graph in FIG. 7 represents the Product Sensitivity Values derived from cooking rate curves such as the curves illustrated in FIG. 6. The ordinate of the graph in FIG. 7 represents a compensation factor of an arbitrary scale. In the example of FIG. 7, a scale of 0–15 has been used. Food products having higher compensation numbers have higher Product Sensitivity Values and vice versa. A value of 0 means that no compensation of the food product takes place. A scale using numbers from 0–15 is easily translated into binary data for use in the computer controlled oven of the present invention. One skilled in the art will appreciate that the particular numerical scale chosen is arbitrary and may be tailored to the particular oven being controlled, the needs of the particular users, and the degree of resolution required in the control system to properly cook food products. It is also to be noted that the particular curve 224 shown in FIG. 7 is a linear curve, but this is not a requirement. Depending upon the particular application, the relationship used to translate from Product Sensitivity Value to compensation factor (as represented by curve 224) may be any suitable function for the particular application.

The purpose of the graph in FIG. 7 is to place all food products on a scale which can then be easily understood and used by an oven operator. The oven operator does not have to have any knowledge of cooking curves, Product Sensitivity Values, or cooking rates. The operator merely takes the desired compensation factor and programs it into the cooking control apparatus of the present invention in order to ensure that all food products which have the same Product Sensitivity Value are cooked in a uniform manner.

It should also be noted that the Product Sensitivity Values plotted on the abscissa of the graph in FIG. 7 may be arranged so that they decrease in value as one moves away from the origin along the abscissa. If this were the case, a curve with a negative slope translating the Product Sensitivity Values to the compensation numbers would be generated and the equation describing the curve would include this negative slope when making the translation from Product Sensitivity Values to arbitrary compensation number.

As described earlier, in accordance with another aspect of the invention, a plurality of temperature sensing probes are used at a number of selected locations within the oven. We found that by putting at least one sensor per zone in the heated air plenum (in the case of infrared ovens, measuring the IR source temperature) and at least one sensor in the air returning to the heat source (in an infrared oven, within a chamber protected from the IR line of sight, we were better able to determine the best waiting factors to use. We also found that we were better able to relate these measured values to the cooking rate of the product in the oven.

As shown in FIG. 1, four temperature probes 58, 60, 62, and 64, which may be platinum resistance temperature sensing elements, thermistor elements, or other suitable temperature sensors are positioned to measure the temperatures in the oven cavity 14. The temperatures measured by each of the temperature probes are used to determine average temperatures by selectively weighting the sensed temperatures using a suitable weighted temperature function. The weighted temperature function may vary depending on the particular oven being used, the number of temperature probes being used in the oven and the heat distribution characteristics within the oven. Weighted average temperatures can be used to control the temperatures in the entrance zone 42 and the exit zone 44 of the oven, as discussed in more detail below.

A final oven temperature $T_f$ is the final average oven temperature measured in accordance with the weighting values applied to each of the temperature sensing probes. The weighting factors for the various temperature probes are determined empirically depending on the characteristics of the particular oven. An empirically determined function may be used to determine the final oven temperature as described in more detail below.

First, an empirically determined entrance zone average temperature equation may be developed:

$$T_1 = (T_a)(W_a) + (T_b)(1 - W_q) \quad (609)$$

where
$T_1$ = the average temperature of entrance zone 42
$T_a$ = the temperature measured by temperature probe 58
$T_b$ = the temperature measured by temperature probe 60
$W_a$ = an empirically determined entrance zone weighting factor.

Similarly, an empirically determined exit zone average temperature function may be developed:

$$T_2 = (T_c)(W_b) + (T_d)(1 - W_b) \quad (610)$$

where
$T_2$ = the average temperature of exit zone 44
$T_c$ = the temperature measured by temperature probe 62
$T_d$ = the temperature measured by temperature probe 64
$W_b$ = an empirically determined entrance zone weighting factor Equations 609 and 610 may then be determined whether the entrance zone or exit zone temperature measuring probes are used to control the temperature of the oven.

$$T_f = (T_1(\text{FLAG})$$

where
$T_f$ = the average temperature of oven cavity 14
FLAG = Entrance Zone
$T_f = (T_2(\text{FLAG})$ FLAG = Exit Zone In one embodiment of the present invention, weighting factors of $W_a$ and $W_b$ can be selected within a range from 0-1 and FLAG is either entrance or exit.

The final average oven temperature $T_f$ is compared with a preselected, desired product set temperature ($T_s$) and the sign of the difference ($T_s = T_f$) is used to determine whether the oven heat source 26 should be turned on or turned off, as discussed in more detail below. Normally the entrance and exit weighting factors for temperature control are preset at suitably selected values for a particular type of product being cooked. For example, in the present exemplary illustration of cooking either pan or screen pizzas, the weighting factors $W_a$ and $W_b$ would both be set at 0.8. A FLAG is set at either entrance or exit depending upon which zone of the oven is designated as the control zone.

OVERALL SYSTEM OPERATION

Using the previously given explanation of food Product Sensitivity Values and oven temperature measurement, a general explanation of the operation of the method and apparatus of the present invention for controlling the cooking of food products in conveyorized ovens is now provided.

In order to begin the cooking process, the oven operator enters into the system various initialization parameters such as the compensation number of the particular food products, the desired oven temperature, the desired cook time for the food products, the weighting factors $W_a$, $W_b$, for the temperature sensing probes, and the desired oven offset temperature differential between the entrance zone and exit zone of the oven. In another embodiment, the temperature control weighting factors can be determined by the computer and be automatically set. Upon reaching the idling state, the resultant temperatures can be logged. Then two experimental loads (a heavy batch load and a heavy continuous load) with subsequent logged temperature variations would give the computer enough information to automatically determine weighting factors. Once these parameters have been entered into the oven control system of the present invention, they are stored therein and need not be entered again. Once these parameters have been entered into the computer system and the oven cavity has reached the desired cooking temperature, the oven is ready to begin cooking food products.

The operator places the food product to be cooked, in this case, pizza products, on the conveyor in the entrance area of the oven. The pizza is moved by the conveyor toward the entrance to the oven. If more than one type of pizza product is being cooked in the oven, the user additionally presses a button indicating the type of pizza product that is being placed on the conveyor so that the computer will keep track of that product as it moves through oven The pizza is moved towards the entrance zone of the oven by the conveyor. As soon as the leading edge of the pizza breaks the optical beam at the entrance to the oven cavity, the computerized cooking control program of the present invention takes over and controls the cooking of the pizza.

In a preferred embodiment of the present invention, the food product is divided into a plurality of queue elements, each queue element representing a one inch segment along the length of any product within the oven cavity. Each queue element also has a position field that stores its position in the oven, a time field that stores the total effective cook time the queue element has been in the oven, and a type field indicating the product. Therefore, in effect, the oven controls the cooking of each one inch increment along the product.

The optical sensor at the beginning of the oven cavity indicates the beginning of a different pizza that has been placed in the oven. Therefore, the computer has information which allows it to calculate how many one inch increments the particular pizza spans. At intervals, which may be fixed or variable, the system samples the oven temperature and calculates an adjusted incremental cook time which increases or decreases the effective cooking time during the sampling interval depending upon whether the sampled oven temperature is above or below the product set temperature.

As will be explained in greater detail hereinafter, the system continuously compares the desired cook time with the total effective cook time for each queue element of the oven during each sampling interval. The system calculates the accumulated, total effective cook time for each queue element of the pizza by integrating all of the incremental adjusted cook times for each queue element for each sampling interval in order to determine a final total effective cook time for the particular queue element. When the total effective cook time is equal to the desired cook time, the product is cooked to the desired "cooked" state. The system additionally adjusts the conveyor speed as a function of the incremental adjusted cook time determined during each sampling interval so that the leading queue element in the queue of food products will exit the oven when the total integrated effective cooking time equals the desired cooking time. The leading queue element controls the conveyor velocity to ensure that the food products are fully cooked as they exit the oven. The computer program and control system of the present invention operates at a sampling and calculation rate that is faster than the highest conveyor speed in order to avoid loss of information.

If a leading queue element of a leading product is fully cooked and yet not at the exit of the oven, the control system of the present invention runs the conveyor at full speed until the last done element has exited the oven. Conversely, if the leading element is at the exit of the oven and yet not fully cooked, the control system of the present invention stops the conveyor to allow the leading element to be fully cooked as it exits the oven. When the leading element passes the end of the last heat impingement point, control is then transferred back to the next leading element in the same product or a new product. Consequently, each element of each product exiting the oven emerges fully cooked Control of the cooking follows the pizza through the oven so the selection of control zone, temperature control, etc., is all based on the element of the food product in the oven which is closest to the exit of the oven. Since control of cooking follows the leading element of the food product through the oven, problems with prior art ovens such as inaccurate temperature sensing due to probe placement are overcome.

DESCRIPTION OF THE COMPUTER PROGRAM AND ASSOCIATED CONTROL SYSTEM

Figure 8:
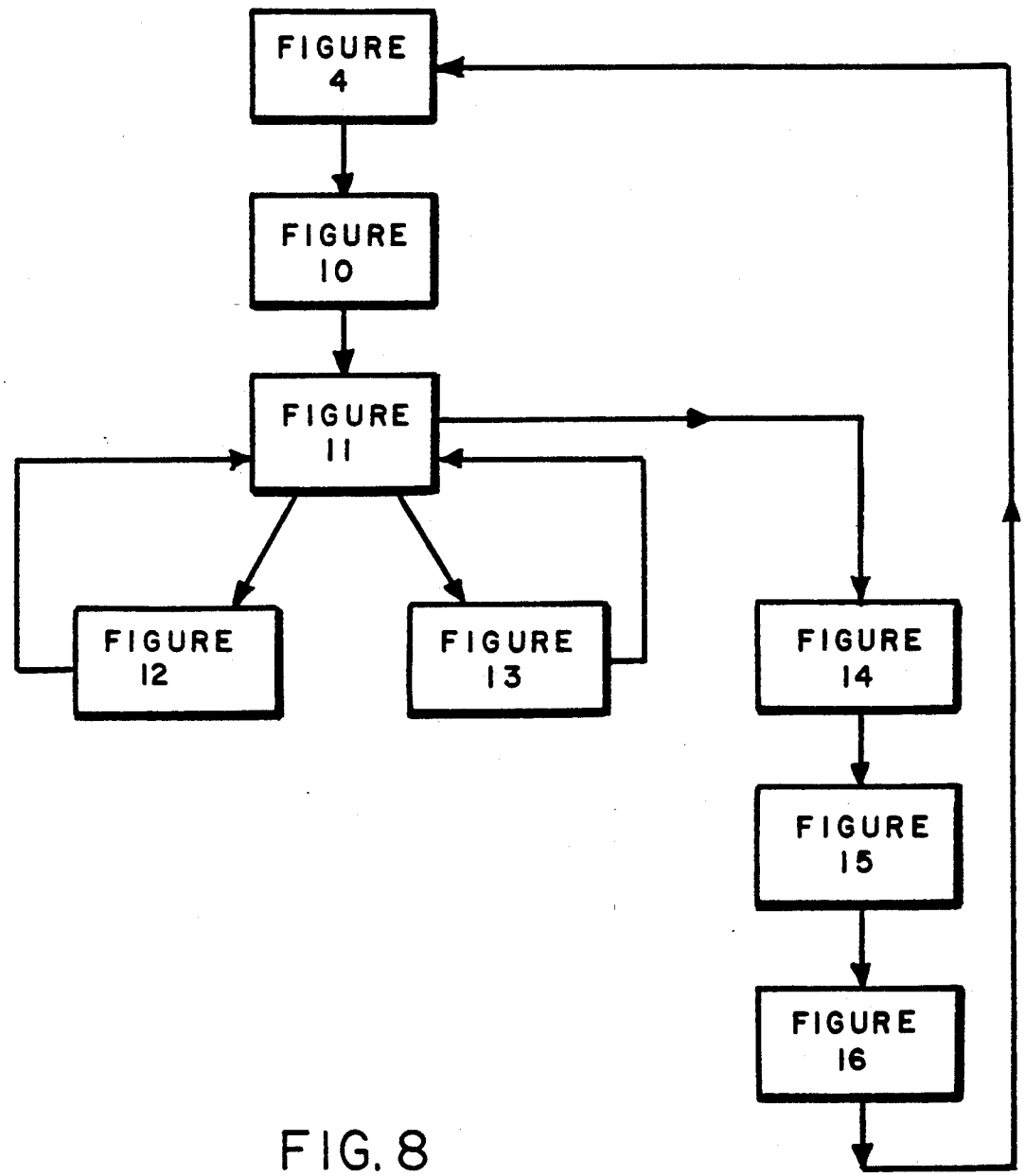
FIG. 8 is a diagram illustrating the proper relationship of flowcharts 9-16.

Reference is now made to FIG. 8, which FIG. illustrates how the flow charts illustrated in FIGS. 9-16 fit together.

It should further be noted, as will be understood from the following detailed description of the program and associated flow charts, that the entire program loop illustrated by flow charts 9-16 must operate fast enough so that there is at least one sample taken and updates of each queue element when the conveyor is operating at its maximum velocity. The method and apparatus of the present invention operates fast enough to proceed through the entire program loop from step 304 to step 538/540 and then loop back to step 304 with the required speed.

Figure 9:
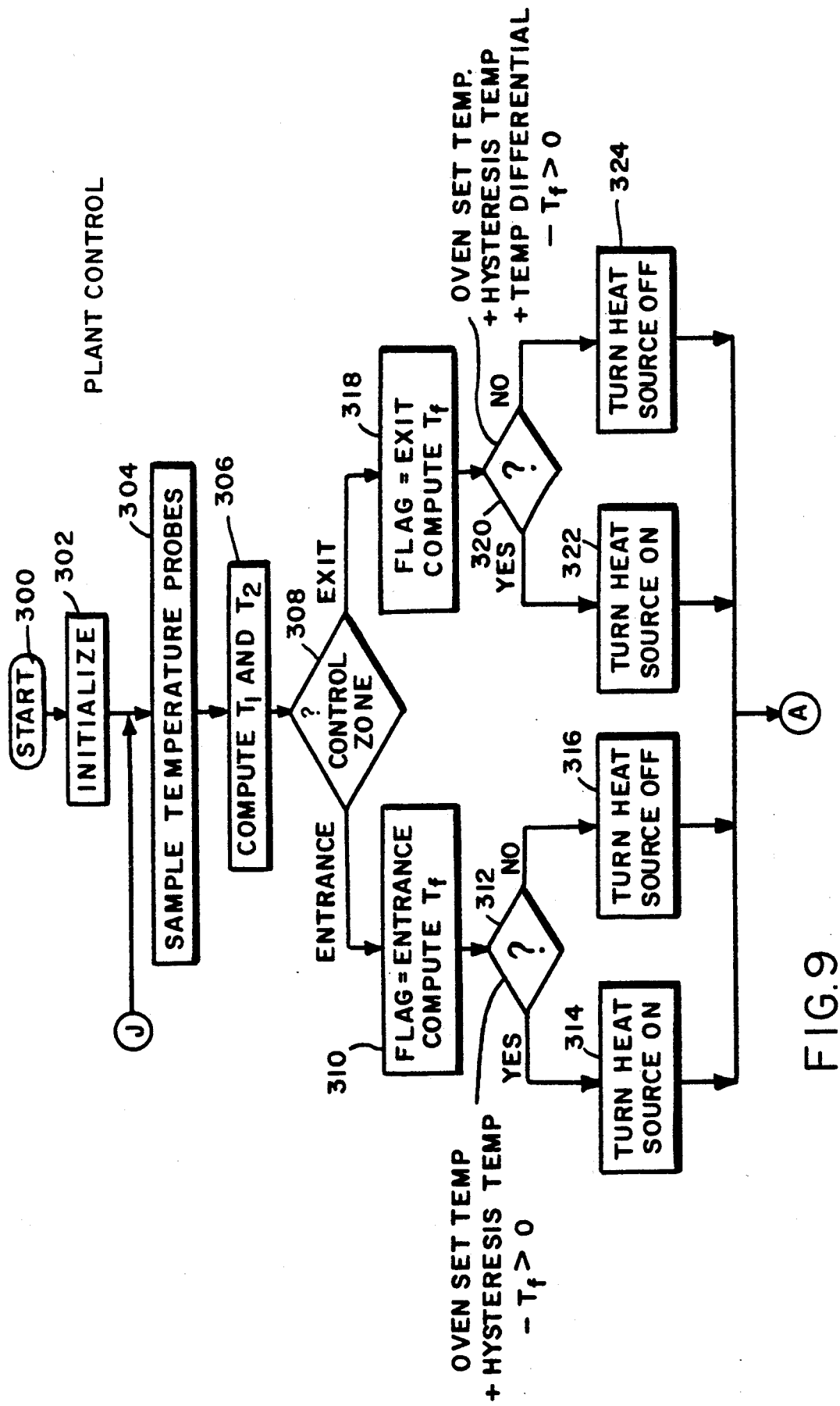
FIG. 9 is a flowchart illustrating the method of temperature control of the present invention carried out by the system illustrated in FIG. 3.

Reference is now made to FIG. 9 which represents the first part of the program control loop. The flow chart illustrated in FIG. 9 describes what may be called "plant control" which for this particular exemplary oven includes controlling the temperature of the oven to maintain the desired oven set temperature selected by the oven operator.

In step 300, the program starts and immediately moves to step 302 which is the initializing step. In one embodiment of the invention, the computer program prompts the operator for the required initializing parameters. In step 302, various initializing parameters are entered into the computer system by the operator. These parameters include the desired oven cavity temperature, the desired cook time COOK.TIME for the food products, the various compensation factors for the food products derived from the compensation factor curve as described in connection with FIGS. 5, 6, and 7 for the various types of food products to be cooked in the oven, and the empirically determined temperature probe weighting factors such as $W_a$, $W_b$. Other initializing parameters entered in step 302 include designation of the entrance zone or the exit zone of the oven as the control zone, an entrance zone/exit zone temperature differential, the length of the oven cavity, the locations of the fingers within the oven cavity in terms of their distances from the entrance end of the oven cavity, and the oven configuration (e.g. a "standard" oven or a "quiet" oven). Once the operator has entered these parameters, they are stored in the computer memory and need not be reentered unless the parameters need to be changed (as may be the case when the type of product to be cooked in the oven changes). One skilled in the art will appreciate that these parameters may be stored on magnetic storage media for reuse by the computer system at a later time. One skilled in the art will also appreciate that, in the case where the oven is used for cooking a predetermined number of different types of food products, these initializing parameters may be permanently stored in a read only memory (ROM), RAM, EPROM or NOVRAM within the computer.

From step 302, the program proceeds to step 304. In step 304, data representing the actual temperature measured by each of the temperature probes 58, 60, 62, and 64 is sampled by the computer and the associated hardware described in connection with FIG. 3. The computer measures and records the temperatures $T_a$, $T_b$, $T_c$, and $T_d$ measured by temperature probes 58 (source temperature, entrance zone), 60 (return temperature, entrance zone), 62 (source temperature, exit zone), and 64 (return temperature, exit zone), respectively. From step 304, the system proceeds to step 306.

In step 306, the program calculates the average temperature in the entrance zone 42 of the oven using equation 609. Additionally, in step 306, the program also calculates the average temperature in the exit zone 44 of the oven using equation 610. From step 306, the program proceeds to step 308.

In step 308, the program determines, based on the information entered in initializing step 302, whether the entrance zone 42 or the exit zone 44 of the oven is the controlling zone as far as temperature control of the oven is concerned. That is, the system determines which zone of the oven will have its temperature controlled. The other zone of the oven will then follow the temperature of the controlled zone.

If the system determines, in step 308, that the entrance zone is the control zone for controlling oven temperature, the system proceeds to step 310. In step 310, the system determines the final average oven temperature using equation 611 and the FLAG equals entrance. From step 310, the system proceeds to step 312.

In step 312, the system compares the final average oven temperature calculated in step 310 with the desired oven set temperature entered in initializing step 302 plus the hysteresis temperature of the oven. Some amount of hysteresis is generally purposely included in the control system in order to avoid undue cycling and wear on heat source 26 and its associated control mechanism which may include various mechanical parts such as relays and motors. If the system determines, in step 312, that the difference between these quantities is greater than 0, this indicates that the actual average oven temperature is less than the desired set oven temperature. Consequently, the system proceeds to step 314 in which heat source 26 is turned on using the control circuitry and hardware illustrated in FIG. 3. Returning to step 312, if the system determines that the difference between the actual average oven temperature in the entrance zone is greater than the desired oven set temperature entered in initializing step 302 plus the temperature hysteresis of the oven, the system proceeds to step 316. In step 316, heat source 26 is turned off using the control circuitry and hardware illustrated in FIG. 3.

Returning to step 308, if the system determines that the exit zone 44 of the oven is the temperature controlled zone, the system proceeds to step 318. In step 318, the system determines the final average oven temperature using equation 611 and FLAG equals exit. From step 318, the system proceeds to step 320.

In step 320, the system compares the final average oven temperature calculated in step 318 with the desired oven set temperature entered in initializing step 302 plus the hysteresis temperature of the oven plus a temperature differential value. The temperature differential value is used by those skilled in the art to indicate a temperature difference between the entrance and exit zones of the oven. A positive temperature differential value indicates that the exit zone should be at a higher temperature than the entrance zone. A negative temperature differential value indicates that the exit zone should be at a lower temperature than the entrance zone of the oven.

If the system determines, in step 320, that the actual average oven temperature is less than the quantity [(oven set temperature)+(hysteresis)+(temperature differential)], the system proceeds to step 322. In step 322, the system turns heat source 26 on using the control circuitry and hardware illustrated in FIG. 3. On the other hand, if the system, in step 320, determines that the quantity [(oven set temperature)+(hysteresis)+-(temperature differential)] is greater than the actual average oven temperature calculated in step 318, the system proceeds to step 324. In step 324, heat source 26 is turned off using the control circuitry and hardware illustrated in FIG. 3.

Figure 10:
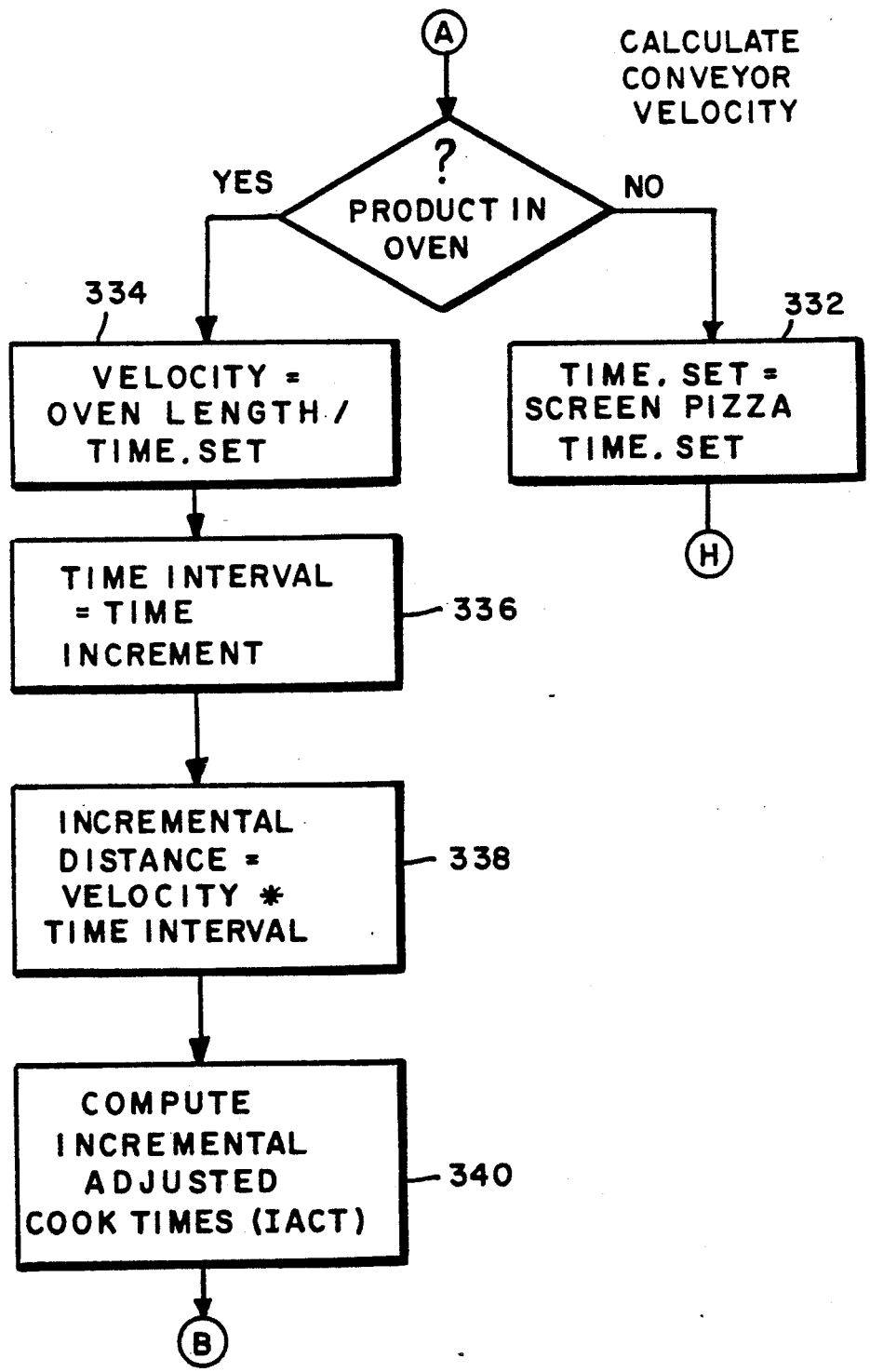
FIG. 10 is a flowchart illustrating the method of calculating the present conveyor speed and incremental adjusted cook times (IACT) carried out by the system of FIG 3.

Once the oven temperature for a given sample interval has been measured and corrected if necessary, the computer system proceeds to step 330 illustrated in FIG. 10 from any of steps 314, 316, 322, and 324. FIG. 10 illustrates the portion of the program that is used to calculate the speed of the conveyor during the particular sample interval. An incremental adjusted cook time for the food product in the particular queue element is also calculated.

Referring to FIG. 10 in more detail, in step 330, the system determines whether or not there is a food product in the oven. The system makes this determination by checking whether or not a queue pointer has a value greater than zero. If the system determines that there is no food product in the oven, the system proceeds to step 332. In step 332, a set time TIME.SET is made equal to the desired cook time for a screen pizza as a default value. The set time TIME.SET is the time needed for any queue element to move through the oven from beginning to end at a constant conveyor velocity. From step 332, the system proceeds to step 490 illustrated in FIG. 15 which portion of the program will be described in greater detail later on.

Returning to step 330, if the system determines that there is in fact a food product in the oven, the system proceeds to step 334. In step 334, the system calculates the velocity of the conveyor by dividing the total oven length (which has been previously entered into the computer system in appropriate units) by the set TIME.SET. From step 334, the program proceeds to step 336.

In step 336, the system determines a time interval which is equal to the time increment measured in appropriate units between samples. The time increment between samples does not have to be a fixed time interval. It may be a variable time increment as well. The time increment is equal to whatever the particular sampling time or times are being used for a particular application. From step 336, the program proceeds to step 338.

In step 338, the system determines the incremental distance that the conveyor has traveled in the time interval between samples by multiplying the velocity determined in step 334 by the time interval determined in step 336. From step 338, the program proceeds to step 340.

In step 340, the system calculates an incremental adjusted cook time IACT. This incremental adjusted cook time indicates what portion of the set or desired cook time entered in initializing step 302 has been accomplished in the time interval between the previous sample and the present sample. As will be explained, this incremental adjusted cook time is based upon a number of factors, such as the type of food product, the Product Sensitivity Value of that food product, and whether or not the particular queue element of the food product being sampled is presently under a heat finger. In a preferred embodiment, the incremental adjusted cook time (IACT) may take on one of twelve values from the following equations:

$$IACT\ 1 = [SEN]\ (CTF)*(\text{Time Interval}) \quad (612)$$
where Time Interval is a time increment between samples in appropriate units.
CTF is a Cook Time Factor.

$$IACT\ 2 = [SEF]\ (CTF)*(\text{Time Interval}) \quad (613)$$

$$IACT\ 3 = [PEN]\ (CTF)*(\text{Time Interval}) \quad (614)$$

$$IACT\ 4 = [PEF]\ (CTF)*(\text{Time Interval}) \quad (615)$$

$$IACT\ 5 = [SXN]\ (CTF)*(\text{Time Interval}) \quad (616)$$

$$IACT\ 6 = [SXF]\ (CTF)*(\text{Time Interval}) \quad (617)$$

$$IACT\ 7 = [PXN]\ (CTF)*(\text{Time Interval}) \quad (618)$$

$$IACT\ 8 = [PXF]\ (CTF)*(\text{Time Interval}) \quad (619)$$

$$IACT\ 9 = [UEN]\ (CTF)*(\text{Time Interval}) \quad (620)$$

$$IACT\ 10 = [UEF]\ (CTF)*(\text{Time Interval}) \quad (621)$$

$$IACT\ 11 = [UXN]\ (CTF)*(\text{Time Interval}) \quad (622)$$

$$IACT\ 12 = [UXF]\ (CTF)*(\text{Time Interval}) \quad (623)$$

The incremental adjusted cook time essentially indicates whether or not the time interval between samples during which the food product has been cooked will be increased or decreased or unchanged by a factor depending upon the type of food product, whether or not the food product is in the entrance zone or the exit zone of the oven, whether or not the food product is under a hot air finger, and how much the oven temperature has varied since the previous sample. These factors are combined in order to create a cook time factor CTF that is used to adjust the time interval determined in step 336. This cook time factor can be seen in equations 612–623 in which the time interval is multiplied by this adjusting factor in order to determine one of the twelve incremental adjusted cook times.

As noted earlier, the program is a loop. The cook time factors used to determine the various incremental adjusted cook times (IACT 1–12) are actually determined from the previous pass through the program loop during the just previous sampling interval. The determination of the cook time factors is explained in more detail later on in connection with FIGS. 15 and 16. The items in square brackets are mnemonics which indicate the conditions for determining the cook time factors. These conditions are also explained in connection with FIGS. 15 and 16.

For the moment, it is sufficient to understand this portion of the invention to say that if the oven temperature is lower than the desired oven set temperature, the system calculates an incremental adjusted cook time by using a cook time factor that is less than 1. This results in an incremental adjusted cook time for the sampling interval which is less than the actual time interval to compensate for the reduced degree of cooking that has occurred in the time interval because of reduced oven temperature.

On the other hand, if the oven temperature is higher than the desired product set temperature, the system calculates an incremental adjusted cook time by using a cook time factor that is greater than 1. This results in an incremental adjusted cook time for the sampling interval which is greater than the actual time interval to compensate for the increased degree of cooking that has occurred in the time interval because of the increased oven temperature.

Figure 11:
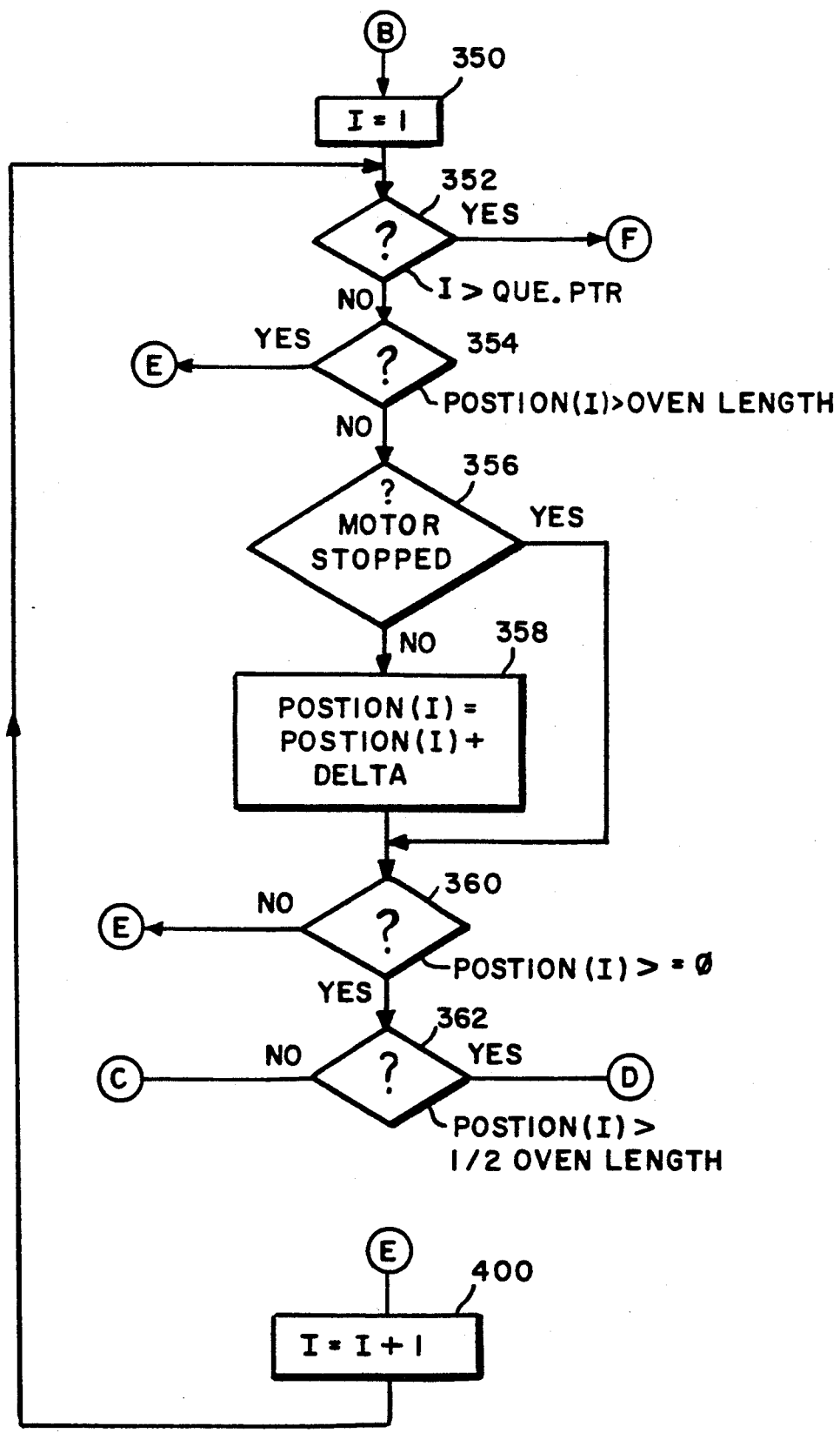
FIG. 11 is a flowchart illustrating the method of updating the queue element positions in the oven carried out by the system in FIG. 3.

Once the system has completed step 340 and calculated the appropriate incremental adjusted cook time factors for the queue elements, the system proceeds to step 350 shown in FIG. 11. The flow chart illustrated in FIG. 11 represents what is called the queue element field update portion of the program. The portion of the program illustrated in FIG. 11 updates the current position in the oven with respect to the entrance point of the oven for each element in the queue of elements and additionally, in conjunction with the portion of the program illustrated in FIG. 12 and FIG. 13, updates the total amount of effective cook time each queue element has been in the oven.

In step 350, the system begins with the first queue element, that is, I=1. From step 350, the system proceeds to step 352 in which a check is made to determine whether or not the current value of a queue element, I, is greater or less than the value of the queue pointer. The queue pointer is a data structure indicating how many oven elements are currently in the queue. When the value of the queue pointer is larger than 0, there are products in the oven. If the system determines that the value of I is greater than the value of the queue pointer, than the position of and the total time each queue element has been updated, and the system proceeds to step 450 in FIG. 14. On the other hand, if the system determines, in step 352, that the value of the queue pointer is less than the value of the current queue element I, the system proceeds to step 354.

In step 354, the system determines whether or not the position of the current queue element I is greater than the length of the oven (entered in initializing step 302). If the system determines that the position of the current queue element I is greater than the oven length, the current queue element is outside the oven and therefore, no updating is required. The system proceeds to step 400 in which the current queue element being operated upon is incremented. From step 400, the system loops back to step 352 and processing continues as already previously described. On the other hand, if the system determines, in step 354, that the position of the current queue element I is less than the oven length, that is, the current queue element is inside the oven cavity, the system proceeds to step 356.

In step 356, the system determines whether or not the conveyor motor is stopped. If the system determines that the conveyor motor is not stopped, i.e., that the conveyor is moving, the system proceeds to step 358. In step 358, the position of the queue element I in the oven is updated. The updated position is calculated by taking the position of the current queue element I with respect to the entrance of the oven, and adding to this position a delta position that is determined by the incremental distance traveled calculated in step 338. From step 358, the program proceeds to step 360. Returning to step 356, if the system had determined that the motor was stopped and therefore the conveyor was not moving, there is no need to update the position of the current queue element, and therefore, the system proceeds directly to step 360.

In step 360, the system determines whether the position of the current queue element I is greater than 0. This in effect determines whether or not the current queue element of the product has reached the entrance of the oven and broken the detector beam. If the system determines in step 360 that the position of the current queue element I is less than 0, indicating that the current queue element has not entered the oven yet, the system proceeds to step 400 and processing continues as already previously described. If, on the other hand, the system determines that the position of the current queue element I is greater than 0, indicating that the position of the current queue element I is inside the oven, the system proceeds to step 362.

In step 362, the system determines whether the current queue element I is in the entrance zone or the exit zone of the oven. During normal operation, the system software will generally process the exit zone queue elements first. The system determines which zone the current queue element is in by checking whether or not the position of the current queue element I is greater than one half the oven length. If the system determines, in step 362, that the position of the current queue element is less than one half the oven length, this indicates that the current queue element I is in the entrance zone of the oven. Therefore, the system proceeds from step 362 to step 370 illustrated in FIG. 12.

Figure 12:
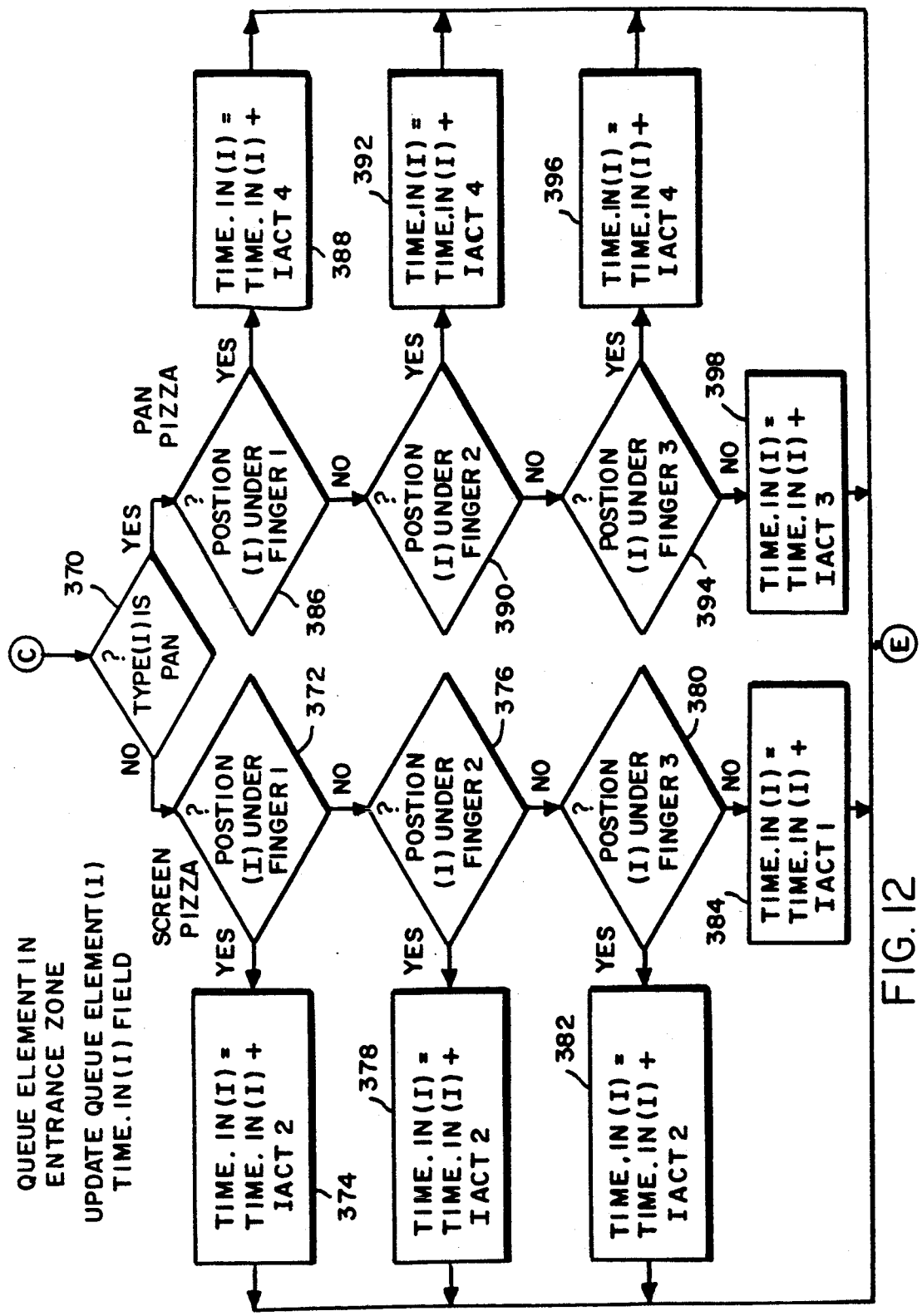
FIG. 12 is a flowchart illustrating the method of updating the total time for a queue element carried out by the system of FIG. 3 if the queue element is in the entrance zone of the oven.

FIG. 12 is a flow chart illustrating how the total effective time that a queue element has been in the oven is updated. FIG. 12 also illustrates the update procedure when the current queue element is in the entrance zone of the oven. FIG. 12 particularly illustrates an important aspect of the present invention in which the system integrates each incremental adjusted cook time determined for each queue element during each pass through the program control loop. By integrating the incremental adjusted cook time for each queue element, the system keeps track of the total effective cook time each queue element has been in the oven. This in essence is integrating the incremental cooking rates.

To maintain generality, the portion of the program illustrated in FIG. 12 checks the location of each queue element with respect to each finger regardless of the programmed location of each finger. Furthermore, the system of the present invention is not limited to checking the locations of just the three fingers illustrated, there may be as many fingers as necessary in the oven.

Referring now to FIG. 12, in step 370, the system determines whether or not the particular type of pizza in the current queue element is a pan pizza by checking a "type" field associated with the current queue element. A string in the "type" field is "screen" or "pan" as entered by the food product type switches 124 illustrated in FIG. 3. These product type switches are activated by the oven operator when the pizza is placed in the oven. If the system determines that the pizza is not a pan pizza i.e., that the pizza is a screen pizza, the system proceeds to step 372.

In step 372, the system determines whether or not the current queue element I is under hot air finger number 1 by comparing the position of hot air finger number 1 entered in initializing step 302 with the calculated position of the current queue element I determined in step 358. If the system determines that the current queue element I is under hot air finger number 1, the system proceeds to step 374. In step 374, the total effective cook time TIME.IN(I) that the current queue element I has been in the oven is updated by adding the value of IACT 2 calculated in step 340 to the previously accumulated total effective cook time that the current queue element I has been in the oven. Returning to step 372, if the system determines that the current queue element I is not under hot air finger number 1, the system proceeds to step 376.

In step 376, the system determines whether or not the current queue element I is under hot air finger number 2 by comparing the position of hot air finger number 2 entered in initializing step 302 with the calculated position of current queue element I determined in step 358. If the system determines that the queue element is under hot air finger number 2, the program proceeds to step 378. In step 378, the total effective cook time TIME.IN(I) that the current queue element I has been in the oven is updated by adding the value of IACT 2 calculated in step 340 to the previously accumulated total effective cook time that the current queue element I has been in the oven. Returning to step 376, if the system determines that the current queue element I is not under hot air finger number 2, the system proceeds to step 380.

In step 380, the system determines whether or not the current queue element I is under hot air finger number 3 by comparing the position of hot air finger number 3 entered in initializing step 302 with the calculated position of the current queue element I determined in step 358. If the system determines that the current queue element I is under hot air finger number 3, the proceeds to step 382. In step 382, the total effective cook time TIME.IN(I) that the current queue element I has been in the oven is updated by adding the value of IACT 2 calculated in step 340 to the previously accumulated total effective cook time that the current queue element I has been in the oven. Returning to step 380, if the system determines that the current queue element I is not under hot air finger number 3, the program proceeds to step 384.

In step 384, the total effective cook time TIME.IN(I) that the current queue element I has been in the oven is updated by adding the value of IACT 1 calculated in step 340 to the previously accumulated total effective cook time that the current queue element I has been in the oven.

Returning to step 370, if the system determines that the type of pizza occupying the current queue element I is a pan pizza, the system proceeds to step 386.

In step 386, the system determines whether or not the current queue element I is under hot air finger number 1 by comparing the position of hot air finger number 1 entered in initializing step 302 with the calculated position of the current queue element I determined in step 358. If the system determines that queue element I is under hot air finger number 1, the system proceeds to step 388. In step 388, the total effective cook time TIME.IN(I) that the current queue element I has been in the oven is updated by adding the value of IACT 4 calculated in step 340 to the previously accumulated total effective cook time that the current queue element I has been in the oven. Returning to step 386, if the system determines that the current queue element I is not under hot air finger number 1, the system proceeds to step 390.

In step 390, the system determines whether or not the current queue element I is under hot air finger number 2 by comparing the position of hot air finger number 2 entered in initializing step 302 with the calculated position of the current queue element I determined in step 358. If the system determines that queue element I is under hot air finger number 2, the system proceeds to step 392. In step 392, the total effective cook time TIME.IN(I) that the current queue element I has been in the oven is updated by adding the value of IACT 4 calculated in step 340 to the previously accumulated total effective cook time that the current queue element I has been in the oven. Returning to step 390, if the system determines that the current queue element I is not under hot air finger number 2, the system proceeds to step 394.

In step 394, the system determines whether or not the current queue element I is under hot air finger number 3 by comparing the position of hot air finger number 3 entered in initializing step 302 with the calculated position of the current queue element I determined in step 358. If the system determines that the current queue element I is under hot air finger number 3, the system proceeds to step 396. In step 396, the total effective cook time TIME.IN(I) that the current queue element I has been in the oven is updated by adding the value of IACT 4 calculated in step 340 to the previously accumulated total effective cook time that the current queu element I has been in the oven. Returning to step 396, if the system determines that the current queue element I is not under hot air finger number 3, the system proceeds to step 398.

In step 398, the total effective cook time TIME.IN(I that the current queue element I has been in the oven is updated by adding the value of IACT 3 calculated in step 340 to the previously accumulated total effective time that the current queue element I has been in the oven.

When the system has completed any one of steps 374, 378, 382, 384, 388, 392, 396, or 398, the system proceeds to step 400 illustrated in FIG. 11. In step 400, the current queue element I is incremented by 1 and the program loops back to step 352 where processing continues as already previously described. The program continues in this loop until the position of each queue element I in the entrance zone of the oven and the total effective cook time TIME.IN(I each queue element I in the entrance zone of the oven has been in the oven is updated.

Figure 13:
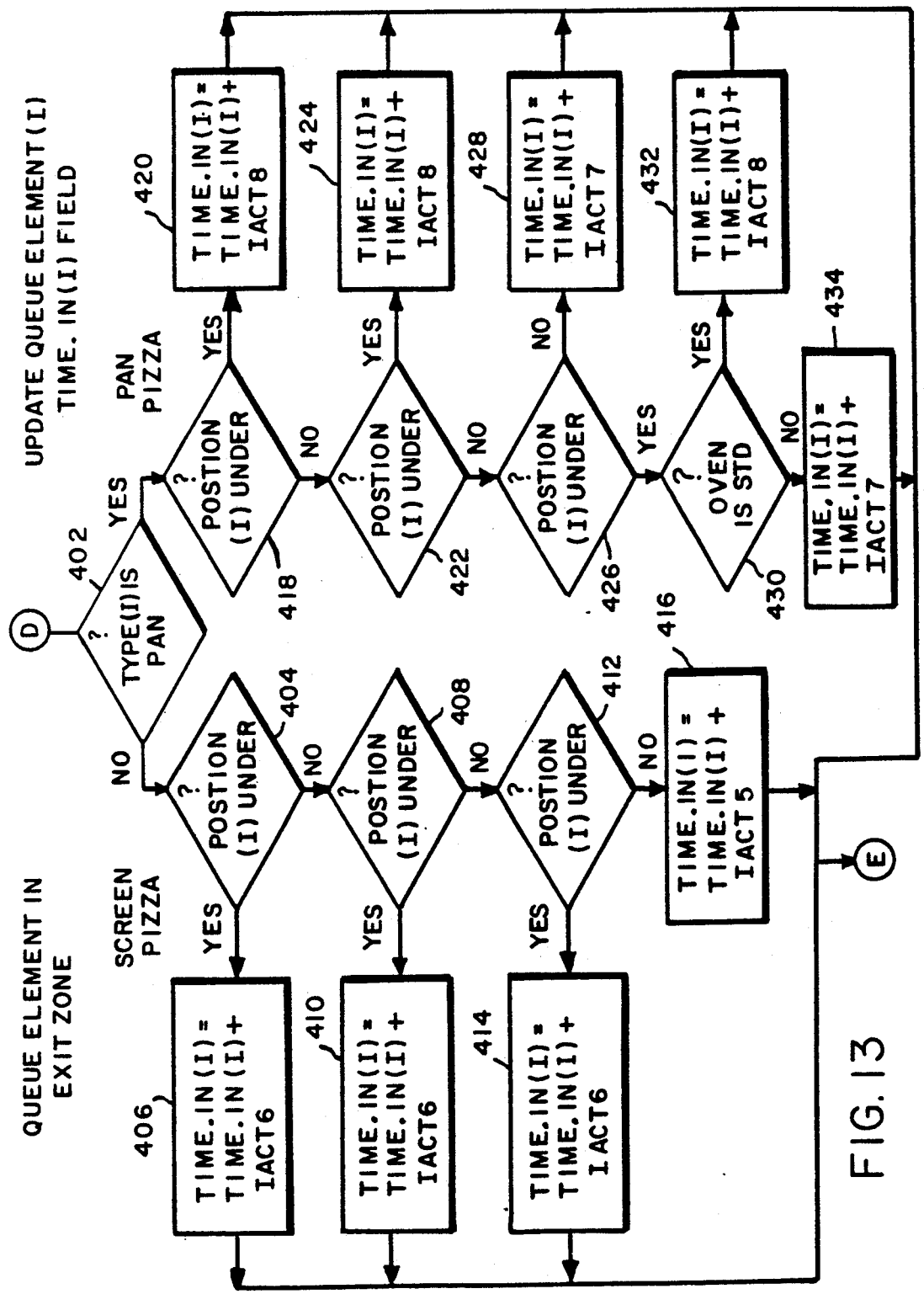
FIG. 13 is a flowchart illustrating the method of updating the total time for a queue element carried out by the system of FIG. 3 if the queue element is in the exit zone of the oven.

Returning to step 362 in FIG. 11, if the system determines that the current queue element I is in the exit zone of the oven, the system proceeds to step 402 illustrated in FIG. 13. The system determines that the current queue element I is in the exit zone of the oven by comparing the position of the current element I with one-half the oven length. If the position of the current queue element I is greater than one half the oven length, then the current queue element I is in the exit zone of the oven.

FIG. 13 is a flowchart illustrating how the total time that a queue element has been in the oven is updated if the queue element I is in the exit zone of the oven. One skilled in the art will appreciate that the steps illustrated in FIG. 13 for updating in the exit zone of the oven are similar to the steps illustrated in FIG. 12 for updating in the entrance zone of the oven. In particular, FIG. 13 also illustrates the integration of each incremental adjusted cook time for each queue element as explained in connection with the portion of the program illustrated in FIG. 12.

To maintain generality, the portion of the program illustrated in FIG. 13 checks the location of each queue element with respect to each finger regardless of the programmed location of each finger. Furthermore, the system of the present invention is not limited to checking the locations of just the three fingers illustrated, there may be as many fingers as necessary in the oven.

Referring to FIG. 13 in more detail, in step 402, the system determines whether or not the type of pizza occupying queue element I is a pan pizza by checking the "type" field of the current queue element. A string in the "type" field is "screen" or "pan" as entered by the food product type switches 124 illustrated in FIG. 3. These product type switches are activated by the oven operator when the pizza is placed in the oven. If the system determines that the type of pizza is not a pan pizza, that is, the pizza is a screen pizza, the program proceeds to step 404.

In step 404, the system determines whether or not the current queue element I is under hot air finger number 1 by comparing the position of hot air finger number 1 entered in initializing step 302 with the calculated position of the current queue element I determined in step 358. If the system determines that the current queue element I is under hot air finger number 1, the system proceeds to step 406. In step 406, the total effective cook time TIME.IN(I) that the current queue element I has been in the oven is updated by adding the value of IACT 6 calculated in step 340 to the previously accumulated total effective cook time that the current queue element I has been in the oven. Returning to step 404, if the system determines that the current queue element I is not under hot air finger number 1, the system proceeds to step 408.

In step 408, the system determines whether or not the current queue element I is under hot air finger number 2 by comparing the position of hot air finger number 2 entered in initialing step 302 with the calculated position of the current queue element I determined in step 358. If the system determines that the current queue element I is under hot air finger number 2, the system proceeds to step 410. In step 410, the total effective cook time TIME.IN(I) that the current queue element has been in the oven is updated by adding the value of IACT 6 calculated in step 340 to the previously accumulated total effective cook time that the current queue element I has been in the oven. Returning to step 408, if the system determines that the current queue element I is not under hot air finger number 2, the system proceeds to step 412.

In step 412, the system determines whether or not the current queue element I is under hot air finger number 3 by comparing the position of hot air finger number 3 entered in initialing step 302 with the calculated position of the current queue element I determined in step 358. If the system determines that the current queue element I is under hot air finger number 3, the system proceeds to step 414. In step 414, the total effective cook time TIME.IN(I) that the current queue element I has been in the oven is updated by adding the value of IACT 6 calculated in step 340 to the previously accumulated total effective cook time that the current queue element I had been in the oven. Returning to step 412, if the system determines that queue element I is not under hot air finger number 3, the program proceeds to step 416.

In step 416, the total effective cook time TIME.IN(I) that the current queue element I has been in the oven is updated by adding the value of IACT 5 calculated in step 340 to the previously accumulated total effective cook time that the current queue element I has been in the oven.

Returning to step 402, if the system determines that the type of pizza occupying the current queue element I is a pan pizza, the system proceeds to step 418.

In step 418, the system determines whether or not the current queue element I is under hot air finger number 1 by comparing the position of hot air finger number 1 entered in initialing step 302 with the calculated position of the current queue element I determined in step 358. If the system determines that the current queue element I is under hot air finger number 1, the system proceeds to step 420. In step 420, the total effective cook time TIME.IN(I) that the current queue element I has been in the oven is updated by adding the value of IACT 8 calculated in step 340 to the previously accumulated total effective cook time that the current queue element I has been in the oven. Returning to step 418, if the system determines that the current queue element I is not under hot air finger number 1, the program proceeds to step 422.

In step 422, the system determines whether or not the current queue element I is under hot air finger number 2 by comparing the position of hot air finger number 2 entered in initialing step 302 with the calculated position of the current queue element I determined in step 358. If the system determines that the current queue element I is under hot air finger number 2, the system proceeds to step 424. In step 424, the total effective cook time TIME.IN(I) that the current queue element I has been in the oven is updated by adding the value of IACT 8 calculated in step 340 to the previously accumulated total effective cook time that the current queue element I has been in the oven. Returning to step 422, if the system determines that the current queue element I is not under hot air finger number 2, the system proceeds to step 426.

In step 426, the system determines whether or not the current queue element I is under hot air finger number 3 by comparing the position of hot air finger number 3 entered in initialing step 302 with the calculated position of the current queue element I determined in step 358. If the system determines that the current queue element I is not under hot air finger number 3, the system proceeds to step 428. In step 428, the total effective cook time TIME.IN(I) that the current queue element I has been in the oven is updated by adding the value of IACT 7 calculated in step 340 to the previously accumulated total effective cook time that the current queue element I has been in the oven. Returning to step 426, if the system determines that the current queue element I is under hot air finger number 3, the program proceeds to step 430.

In step 430, the system determines whether or not the oven is of a standard configuration. That is, the system checks what parameter was entered in the initializing step 302 for oven configuration. If, in step 430, the system determines that the oven is a "standard" configuration having higher air flow, the program proceeds to step 432. In step 432, the total effective cook time TIME.IN(I) that the current queue element I has been in the oven is updated by adding the value of IACT 8 calculated in step 340 to the previously accumulated total effective cook time that the current queue element I has been in the oven. Returning to step 430, if the system determines that the oven is of a "quiet" configuration having lower air flow, the program proceeds to step 434.

In step 434, the total effective cook time TIME.IN(I) that the current queue element I has been in the oven is updating by adding the value of IACT 7 calculated in step 340 to the previously accumulated total effective cook time that the current queue element I has been in the oven.

After any of steps 406, 410, 414, 416, 420, 424, 428, 432, or 434 have been completed, the system proceeds to step 400 illustrated in FIG. 11. In step 400, the current queue element I is incremented by 1 and the program loops back to step 352 where processing continues as already previously described. The program continues in this loop until the position of each queue element I in the exit zone of the oven and the total effective cook time TIME.IN(I) each queue element I in the exit zone of the oven has been in the oven is updated.

One skilled in the art will appreciate that in the portion of the program illustrated in FIGS. 12 and 13, the program does not proceed through every step described during each pass through the control loop. Rather, the system determines which set of conditions meets the requirements of a particular decision block, performs the update function required, exits the loop and proceeds to the next queue element in the queue.

Returning to step 352, illustrated in FIG. 11, the system checks to determine whether or not the current queue element I is larger than the value of the queue pointer. If the system determines, in step 352, that the current queue element I is greater than the value of the queue pointer, this indicates that the position of all queue elements and the accumulated total time which each queue element has been in the oven has been updated. Therefore, the system proceeds to step 450 illustrated in FIG. 14.

Figure 14:
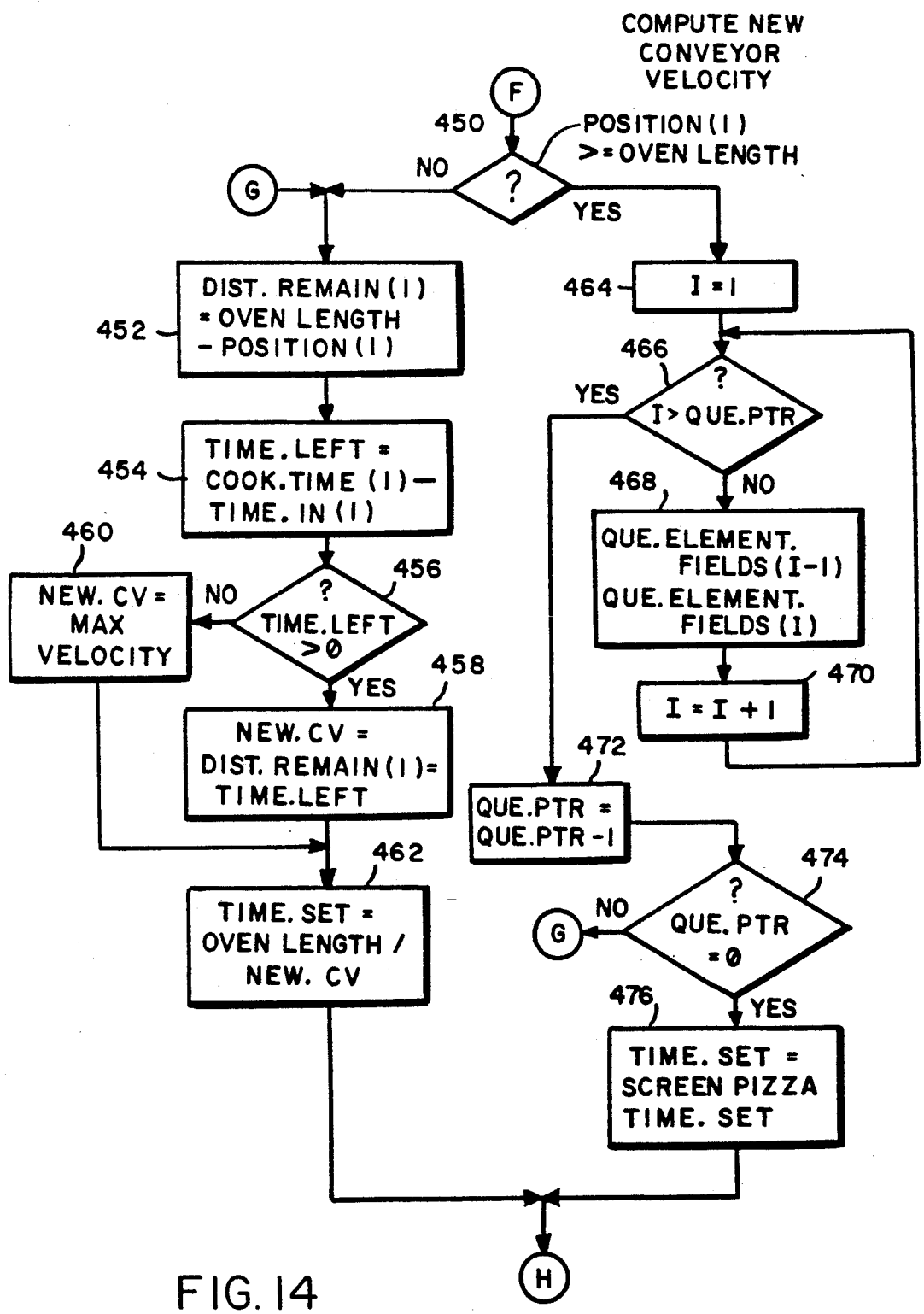
FIG. 14 is a flowchart illustrating the method for computing a new conveyor velocity carried out by the system of FIG. 3.

FIG. 14 illustrates the portion of the program of the present invention which computes a new conveyor velocity as a function of the total effective cook time that the leading queue element I has been in the oven. Where I = 1 indicates the leading queue element. The steps illustrated in FIG. 14 essentially determine a new conveyor velocity that will bring the leading queue element to the end of the oven so that the total effective cook time that the queue element I has been in the oven is equal to the desired cook time entered in initializing step 302.

In step 450, the system determines whether or not the leading queue element is outside the oven cavity by comparing the calculated position of the queue element I with the length of the oven cavity. If the system determines that the leading queue element is still within the oven cavity, that is, if the calculated position of the leading queue element is less than the oven length, the system proceeds to step 452.

In step 452, the system calculates the distance remaining DIST.REMAIN for the leading queue element to reach the end of the oven cavity. The distance remaining is calculated by taking the difference between the length of the oven cavity and the calculated position of the current leading queue element I calculated in step 358. From step 452, the system proceeds to step 454.

In step 454, the system calculates the cooking time left TIME.LEFT by subtracting the total effective cook time TIME.IN(I), calculated in the portions of the program illustrated in FIGS. 12 and 13, that the queue element has been in the oven from the desired cook time COOK.TIME entered in initializing step 302. From step 454, the system proceeds to step 456.

In step 456, the system determines whether or not the cooking time left TIME.LEFT, that is, the difference between the desired cook time COOK.TIME and the total effective cook time TIME.IN(I) that the leading queue element has been in the oven, is greater than zero. If the system determines that cooking time left is greater than zero, indicating that more time is needed in order to cook the product, the system proceeds to step 458.

In step 458, the system determines a new conveyor velocity NEW.CV which is equal to the distance remaining DIST.REMAIN calculated in step 452 divided by the cooking time left TIME.LEFT calculated in step 454. From step 458, the system proceeds to step 462.

Returning to step 456, if the system determines that the time left TIME.LEFT was not greater than zero, indicating that the total time TIME.IN(I) that the food product has been in the oven is equal to or greater than the desired cook time COOK.TIME, the system proceeds to step 460. In step 460, the system calculates a new conveyor velocity NEW.CV that is equal to the maximum velocity of the conveyor system in order to bring the leading queue element out of the oven as quickly as possible in order to avoid overcooking the food product. From step 460, the system proceeds to step 462.

In step 462, a new set time TIME.SET is calculated. The set time is the time needed for any queue element to move through the oven from the entrance end of the oven to the exit end of the oven at a constant conveyor velocity. In step 462, a set time TIME.SET is calculated by dividing the length of the oven cavity by the new conveyor velocity NEW.CV calculated in either step 458 or 460. Thus, the conveyor velocity is adjusted to a velocity which brings the leading queue element through the oven in the desired cooking time COOK.TIME if the conveyor moves at a constant velocity.

Returning to step 450, if the system determines that the position of the leading queue element is greater than the length of the oven cavity, which indicates that the leading queue element is outside of the oven cavity, the system proceeds to step 464. In step 464 and the program steps which follow, the system shifts up all of the queue elements by one element. The new leading queue element was the old second queue element. The queue element I equals one. From step 464, the system proceeds to step 466.

In step 466, the system determines whether or not the particular value I is greater than the value of the queue pointer QUE.PTR. If the system determines that the value of I is less than the value of the queue pointer, the system proceeds to step 468.

In step 468, the queue element fields of what was previously the (I-1) queue element are incremented so that they become the queue element fields of the leading queue element (I). From step 468, the system proceeds to step 470.

In step 470, the current value I being operated upon is incremented by 1 and the system proceeds to step 466 where processing continues as already previously described. The system remains in this loop until all of the queue elements and value fields have been updated.

Returning now to step 466, if the system determines that the value of the current queue element I is greater than the value of the set pointer, the system proceeds to step 472.

In step 472, the queue pointer is decremented by 1 and the system proceeds to step 474.

In step 474, the system determines whether or not the queue pointer QUE.PTR is equal to zero If the system determines that the queue pointer QUE.PTR is equal to zero, indicating that there is no food product in the oven, the system proceeds to step 476. In step 476, the set time TIME.SET is made equal to the TIME.SET for a screen pizza. This step provides a default set time. Returning to step 474, if the system determines that the queue pointer is not equal to zero, the system proceeds to step 452 and processing continues as already previously described.

Figure 15:
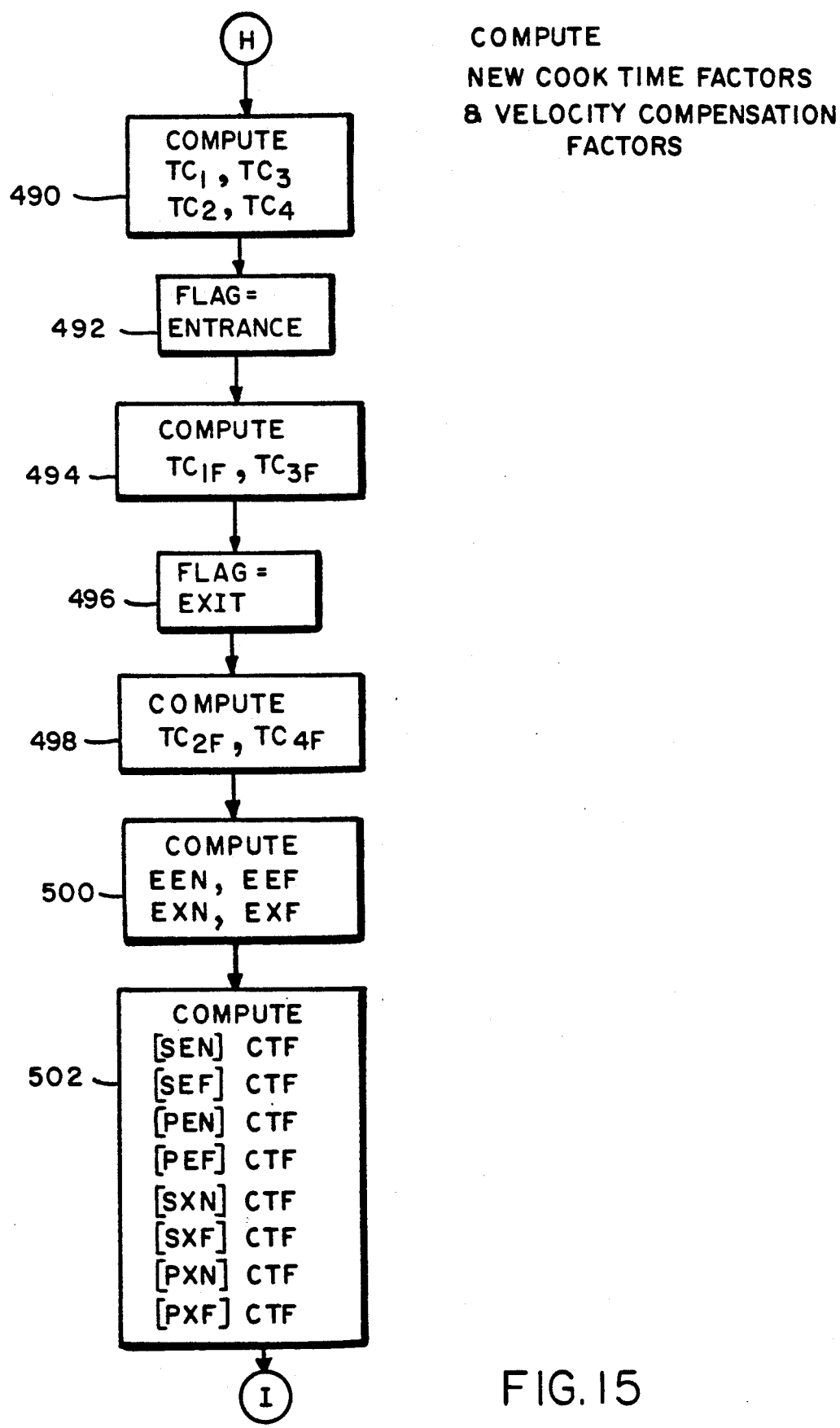
FIG. 15 is a flowchart illustrating the method of computing new cooktime factors and velocity compensation factors carried out by the system of FIG. 3.

From either step 462 or step 476, the system proceeds to step 490 illustrated in FIG. 15.

FIG. 15 illustrates the portion of the program of the present invention which computes new cook time factors CTF and new conveyor velocity compensation factors based on the conveyor speed calculated in either step 458 or step 460, and the set time TIME.SET calculated in either step 462 or step 476. The values calculated by the steps illustrated in FIG. 15 are additionally used for calculation of the incremental adjusted cook time IACT by the portion of the program illustrated in FIG. 10 when the program makes the next succeeding pass during the next sampling interval.

In step 490, the system calculates an average weighted temperature for four different locations in the oven: the average weighted temperature between fingers in entrance zone 42, the average weighted temperature between fingers in exit zone 44, the average weighted temperature under fingers in entrance zone 42, and the average weighted temperature under fingers in exit zone 44. To determine these temperatures the system uses empirically determined equations 624, 625, 626, and 627 respectively.

$$TC_1 = (T_a)(W_y) + (T_b)(1 - W_y) \quad (624)$$

where
$TC_1$ = the average weighted temperature between fingers in entrance zone 42
$W_y$ = an empirically determined weighting factor for oven locations between fingers
$T_a$, $T_b$ = described in equation (609)

$$TC_2 = (T_c)(W_y) + (T_d)(1 - W_y) \quad (625)$$

where
$TC_2$ = the average weighted temperature between fingers in exit zone 44
$W_y$ = an empirically determined weighting factor for oven locations between fingers
$T_c$, $T_d$ = described in equation (610)

$$TC_3 = (T_a)(W_x) + (T_b)(1 - W_x)$$

where
$TC_3$ = the average weighted temperature under fingers in entrance zone 42
$W_x$ = an empirically determined weighting factor for oven locations under fingers
$T_a$, $T_b$ = described in equation (609)

$$TC_4 = (T_c)(W_x) + (T_d)(1 - W_x) \quad (627)$$

where
$TC_4$ = the average weighted temperature under fingers in exit zone 44
$W_x$ = an empirically determined weighting factor for oven locations under fingers
$T_c$, $T_d$ = described in equation (610)

From step 490, the system proceeds to step 492 in which FLAG is set equal to entrance that the entrance zone 42 is being considered. From step 492, the system proceeds to step 494. In step 494, the system computes the average weighted temperature of oven cavity 14 when the entrance zone is being considered for oven locations between fingers and oven locations under fingers using empirically determined equations 628 and 629.

$$TC_{1F} = (TC_1) \quad (628)$$

where $TC_{1F}$ = the average weighted temperature between fingers of oven cavity 14 when entrance zone 42 is being considered
FLAG = Entrance $$TC_{3F} = (TC_3) \quad (629)$$

where $TC_{3F}$ = the average weighted temperature under fingers of oven cavity 14 when entrance zone 42 is being considered
FLAG = Entrance Equation 628 determines the average weighted temperature between fingers of oven cavity 14 when entrance zone 42 is being considered. Equation 629 determines that average weighted temperature under figures of oven cavity 14 when entrance zone 42 is being considered. From step 494, the system proceeds to step 496.

In step 496, the system sets FLAG equal to exit, indicating that the exit zone is being considered. From step 496, the system proceeds to step 498. In step 498, the system computes the average weighted temperature of oven cavity 14 when the exit zone is being considered for oven locations between fingers and oven locations under fingers using empirically determined equations 630 and 631.

$$TC_{2F} = (TC_2) \quad (630)$$

where $TC_{2F}$ = the average weighted temperature between fingers of oven cavity 14 when exit zone 44 is being considered
FLAG = Exit $$TC_{4F} = (TC_4) \quad (631)$$

where $TC_{4F}$ = the average weighted temperature under fingers of oven cavity 14 when exit zone 44 is being considered FLAG = Exit Equation 630 determines the average weighted temperature between fingers of oven cavity 14 when exit zone 44 is being considered. Equation 631 determines the average weighted temperature under fingers of oven cavity 14 when exit zone 44 is being considered. From step 498, the system proceeds to step 500.

In step 500, the system computes empirically determined equations 632-635.

$$EEN = T_s - TC_{1F} \qquad (632)$$

where EEN is an Error function for the case where a queue element is in the Entrance Zone and is Not under a finger $$EXN = T_s - TC_{2F} \qquad (633)$$

where EXN is an Error function for the case where a queue element is in the Egit zone and is Not under a finger $$EEF = T_s - TC_{3F} \qquad (634)$$

where EEF is an Error function for the case where a queue element is in the Entrance zone and is under a Finger $$EXF = T_s - TC_{4F} \qquad (635)$$

where EXF is an Error function for the case where a queue element is in the Egit zone and is under a Finger Equations 632-635 are error functions. These error functions describe the temperature difference between the product set temperature ($T_s$ in FIG. 5) and the actual oven temperature at particular locations. Thus, when the system computes the error functions defined in equations 632-635, a temperature deviation between the desired product set temperature and the actual oven temperature at the particular location is computed. The temperature deviations calculated in step 500 are used in computing the cook time factor which factor will in turn be used to compute the incremental adjusted cooking time IACT whose use has been described in connection with FIGS. 10, 12 and 13. From step 500, the system proceeds to step 502.

In step 502, the system computes empirically determined equations 636-647.

$$[SEN]CTF = (1 - EEN*SLOPE200) \qquad (636)$$

where
SLOPE220 = the slope (1/PSV) of curve 220 in FIG. 6

[SEN] is a mnemonic indicating that this equation determines a cooking time adjustment factor for a Screen pizza in the Entrance zone and Not under a finger.

$$[SEF]CTF = (1 - EEF*SLOPE220) \qquad (637)$$

[SEF] is a mnemonic indicating that this equation determines a cooking time adjustment factor for a Screen pizza in the Entrance zone and under a Finger.

$$[PEN]CTF = (1 - EEN*SLOPE222) \qquad (368)$$

where
SLOPE222 = the slope (1/PSV) of curve 222 in FIG. 6

[PEN] is a mnemonic indicating that this equation determines a cooking time adjustment factor for a Pan pizza in the Entrance zone and Not under a finger.

$$[PEF]CTF = (1 - EEF*SLOPE222) \qquad (639)$$

[PEF] is a mnemonic indicating that this equation determines a cooking time adjustment factor for a Pang pizza in the Entrance zone and under a Finger.

$$[SXN]CTF = (1 - EXN*SLOPE220) \qquad (640)$$

[SXN] is a mnemonic indicating that this equation determines a cooking time adjustment factor for a Screen pizza in the Egit zone and Not under a finger.

$$[SXF]CTF = (1 - EXF*SLOPE220) \qquad (641)$$

[SXF] is a mnemonic indicating that this equation determines a cooking time adjustment factor for a Screen pizza in the Egit zone and under a Finger.

$$[PXN]CTF = (1 - EXN*SLOPE222) \qquad (642)$$

[PXN] is a mnemonic indicating that this equation determines a cooking time adjustment factor for a Pan pizza in the Exit zone and Not under a finger $$[PXF]CTF = (1 - EXF*SLOPE222) \qquad (643)$$

[PXF] is a mnemonic indicating that this equation determines a cooking time adjustment factor for a Pan pizza in the Exit zone and Under a finger $$[UEN]CTF = (1 - EEN*SLOPEZZZ) \qquad (644)$$

[UEN] is a mnemonic indicating that this ion determines a cooking time adjustment factor for an unknown product in the Entrance zone and Not under a finger.

$$[[UEF]CTF = (1 - EEF*SLOPEZZZ) \qquad (645)$$

[UEF] is a mnemonic indicating that this equation determines a cooking time adjustment factor for Unknown product in the Entrance zone and under a Finger.

$$[UXN]CTF = (1 - EXN*SLOPEZZZ) \qquad (646)$$

[UXN] is a mnemonic indicating that this equation determines a cooking time adjustment factor for an Unknown product in the Egit zone and Not under a finger $$[UXF]CTF = (1 - EXF*SLOPEZZZ) \qquad (647)$$

[UXF] is a mnemonic indicating that this equation determines a cooking time adjustment factor for an Unknown product in the Egit zone and under a Finger.

Equations 636-647 are used to compute cook time factors CTF which are then used to compute the incremental adjusted cook times IACT computed in step 340) during the next sampling interval. Since these cook time factors are functions of the amount of temperature difference between the desired temperature and the actual oven temperature multiplied the slope of the cooking rate curve illustrated in FIG. 6, one skilled in the art will appreciate that these cooking time factors are used to increase or decrease the incremental adjusted cooking time IACT that is added to the total effective cook time TIME.IN the product has been in the oven based upon whether the actual oven temperature is above or below the oven set temperature and how sensitive the particular product is to variations in oven temperature, the cooking time factors, and cooking rates.

Equations 644-647 illustrate a general form of the cook time factor. These equations make use of the error functions computed in step 500 and the slope SLOPEZZZ of any arbitrarily determined cooking rate curve for the particular product that is being cooked in the oven. One skilled in the art will appreciate that the present invention is not limited to computation of only the above listed cook time factors. They are given for illustration purposes only. The system of the present invention can determine an unlimited number of cook time factors. The cook time factors determined by the system depend only upon the information entered by the oven operator in initializing step 302. From step 502, the system proceeds to step 510 in FIG. 16.

Figure 16:
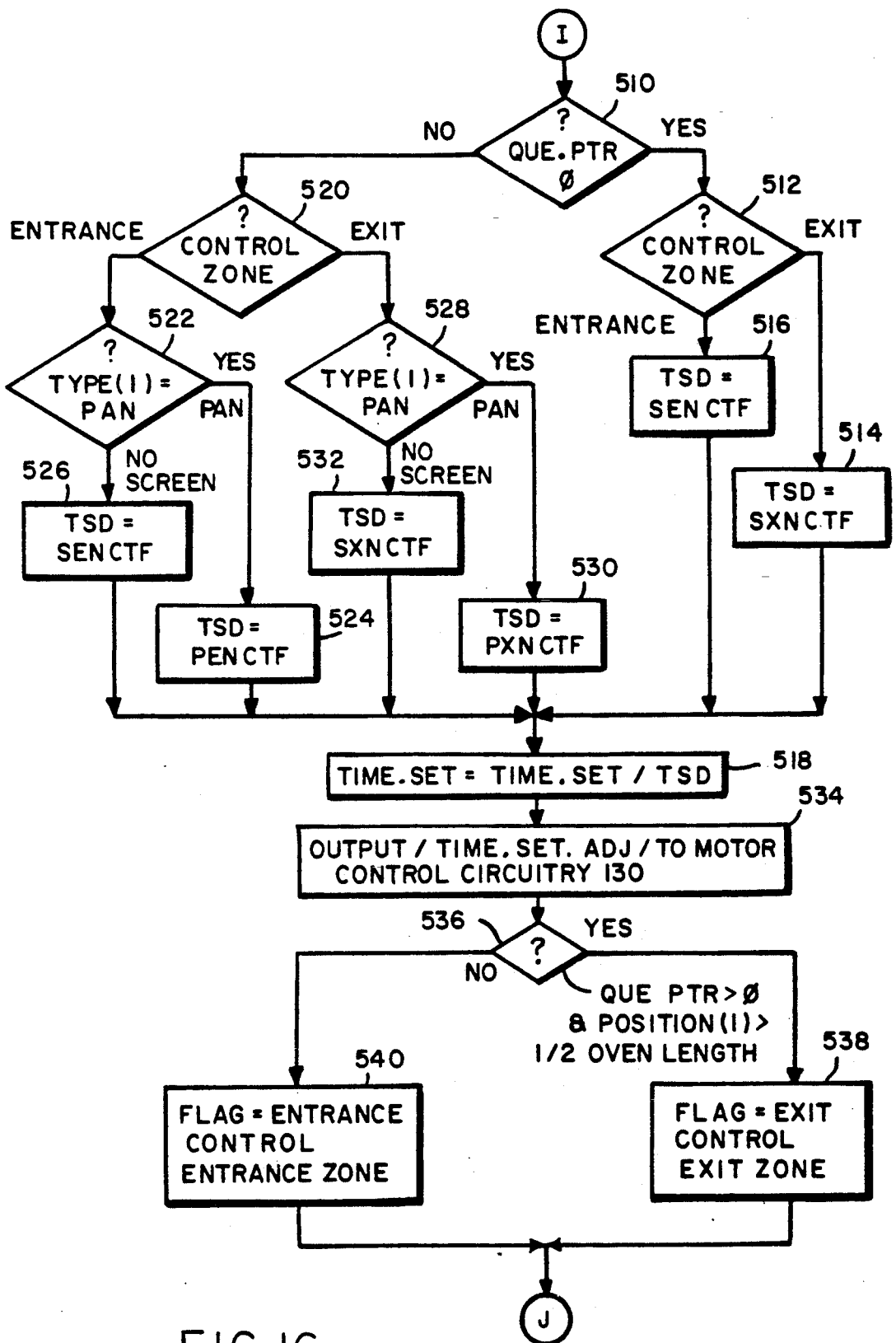
FIG. 16 is a flowchart illustrating the method for computing a new conveyor velocity carried out by the system of FIG. 3.

The portion of the program illustrated in FIG. 16 adjusts set time TIME.SET calculated in either step 462 or step 476 (which set time is used by motor control circuitry 130 in the circuit of FIG. 3 to control the conveyor velocity) based on the cook time factors calculated in step 502. It should be noted that the steps illustrated in FIG. 16 adjust the set time based on the pizzas not being located under fingers because it has been found that using the cook time factors for locations not under fingers produce pizzas which are properly cooked. However, the present invention is not so limited and obviously, other cook time factors and combinations of different cook time factors may be used depending on the particular product being cooked and the particular results desired.

Essentially, this portion of the program decides which cooking time factor to use to compensate the set time TIME.SET. The compensated set time is then sent to the motor controller circuitry 130. The speed of the conveyor is thus adjusted so that the leading queue element will reach the end of the oven at the time when the the total effective cook time TIME.IN the product has been in the oven is equal to the desired cook time COOK.TIME.

In step 510, the system determines whether or not the value of the queue pointer QUE.PTR is equal to zero. If the system determines that the value of the queue pointer is equal to zero, the system proceeds to step 512.

In step 512, the system determines whether the entrance zone or the exit zone is the controlling zone based on information entered in initializing step 302 or a previous pass through the control loop and steps 538 or 540, which steps will be explained in more detail hereinafter. If the system determines that the exit zone is the control zone, the system proceeds to step 514. In step 514, a variable time set divide TSD is set equal to the cook time factor [SXN] CTF determined by equation 640 in step 502. Returning to step 512, if the system determines that the entrance zone is the control zone, the system proceeds to step 516. In step 516, the variable TSD is set equal to the cook time factor [SEN]CTF determined by equation 636 in step 502. From either step 514 or step 516, the system proceeds to step 518.

Returning to step 510, if the system determines that the value of the queue pointer is not equal to zero, meaning that there are pizzas in the oven, the system proceeds to step 520.

In step 520, the system determines whether the entrance zone or the exit zone is the control zone based on information entered in initializing step 302 or a previous pass through the control loop and steps 538 or 540, which steps will be explained in more detail hereinafter. If the system determines that the entrance zone is the control zone, the system proceeds to step 522.

In step 522, the system determines whether the pizza is a pan pizza or a screen pizza by checking which of the food product type switches 124 illustrated in FIG. 3 were activated by the oven operator when the pizza was placed in the oven by checking the "type" field of the leading queue element. If the system determines that the type of pizza is a pan pizza, the system proceeds to step 524. In step 524, the variable TSD is set equal to the cook time factor [PEN]CTF determined by equation 638 in step 502. Returning to step 522, if the system determines that the type of pizza is a screen pizza, the system proceeds to step 526. In step 526, the system sets the variable TSD equal to cook time factor [SEN] CTF determined by equation 636 in step 502.

Returning to step 520, if the system determines that the exit zone of the oven is the control zone, the system proceeds to step 528. In step 528, the system determines whether the pizza is pan pizza or a screen pizza by checking which of the food product type switches 124 illustrated in FIG. 3 were activated by the oven operator when the pizza was placed in the oven by checking the "type" field of the leading queue element. If the system determines that the type of pizza is a pan pizza, the system proceeds to step 530. In step 530, the system sets the variable TSD equal to cook time factor [PXN]CTF determined by equation 642 in step 502. Returning to step 528, if the system determines that the pizza is a screen pizza, the system proceeds to step 532. In step 532, the system sets the variable TSD equal to cook time factor [SXN]CTF determined by equation 640 in step 502.

From any of steps 524, 526, 530 or 532, the system proceeds to step 518. In step 518, the system divides the set time TIME.SET determined in either step 462 or 476 by the variable TSD which has been set equal to one of the cook time factors in one of steps 514, 516, 524, 526, 530, or 532. From step 518, the system proceeds to step 534 in which the adjusted set time TIME.SET.ADJ is sent to the motor controller circuitry 130 in order to adjust the speed of the conveyor. From step 534, the system proceeds to step 536.

In step 536, the system determines whether or not the value of the queue pointer is greater than zero and whether or not the position of the leading queue element is greater than one half the oven length. In step 536, the system determines whether the entrance zone or the exit zone will be the controlling zone based upon the location of the leading queue element that is moving through the oven. If the system determines that the value of the queue pointer is greater than zero and position of the leading queue element is greater than one half the oven length, the system proceeds to step 538. In step 538, the system designates the exit zone as the control zone. Returning to step 536, if the system determines that either the value of the queue pointer is less than or equal to zero and the position of the leading queue element is less than one half the oven length, this indicates that the leading queue element is in the entrance zone of the oven, and the system proceeds to step 540. In step 540, the system designates the entrance zone as the control zone. From step 538 or 540, the system proceeds to step 304 illustrated in FIG. 9 and processing continues as already previously described. The system therefore proceeds through all of the steps just described during each sampling interval to continuously update the position of each queue element in the oven and to integrate the total effective cook time that each queue element has been in the oven as a function of oven temperature.

Another feature in the present invention includes locating a preferred embodiment of heat source, either a hot air jet in a convection or impingement oven, or an infrared panel in an infrared oven near the exit opening in the oven. In conjunction with the control system of the present invention, a heat source at or near the exit of the oven assures that any portion of a product emerging from the oven will be properly cooked or done despite variable conditions in the oven cavity. For example, if an extreme amount of product was placed in the oven which created a very high heat load, control system of the present invention, in conjunction with a heat source loaded near the exit of the oven, can control the speed of the conveyor so that products are fully cooked as they exit the oven, despite any temperature drop within the oven.

Figure 17:
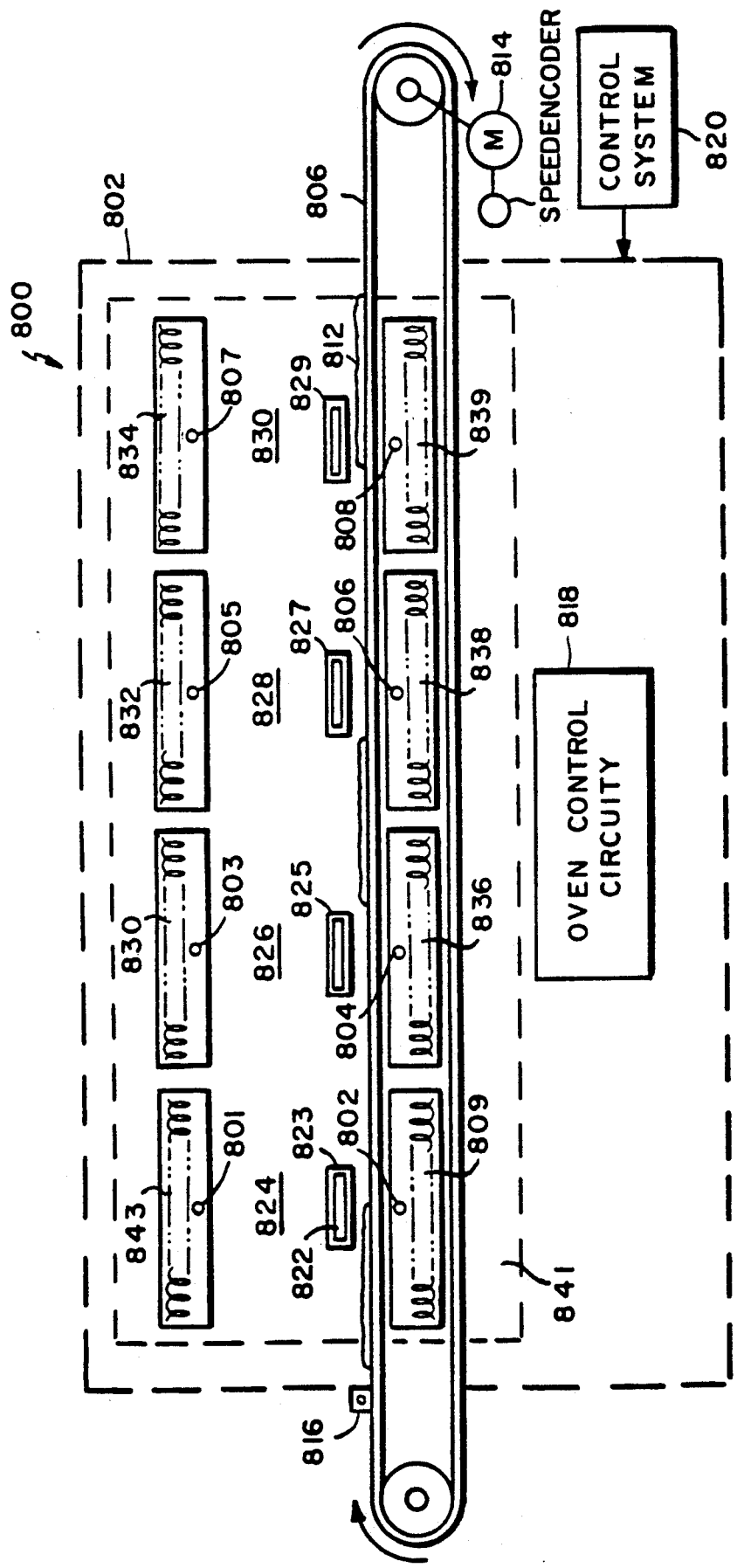
FIG. 17 is a cross-sectional view of an infrared oven employing the present invention taken along a line parallel to the motion of food products through the oven.

Although the present invention has thus far been explained with reference to convection and impingement type ovens, it is also applicable to infrared type ovens as well. Reference is now made to FIG. 17 which figure illustrates in cross-section, a view of an infrared conveyor oven employing the present invention taken along the line parallel to the motion of food products through the oven. In particular, FIG. 17 illustrates a conveyorized oven which may be used to cook a variety of food products, such as pizzas. The oven 800 includes a housing 802 which encloses the oven cavity 841, conveyor 806, infrared heating elements 841, 830, 832, 834, 809, 836, 838, 839 having respective temperature probes 801, 803, 805, 807, 802, 804, 806, 808 disposed in close proximity to the heated surface of each of the infrared panels. Infrared panels 809, 836, 838, 839 are disposed within the conveyor 806 in order to place them inclose proximity to the food product 812 that is being moved along conveyor 806. Although oven 800 has been illustrated with four sets of infrared heating elements, the present invention comprehends control systems for ovens having a greater or lesser number of infrared heating elements. A motor 814 is provided to drive conveyor 806. Optical sensor 816 is provided to detect entrance into the oven cavity 841 of a food product 812. Oven 800 also includes oven control circuitry 818 which includes various relays and other components for supplying electrical power to the infrared heating elements. Control system 820 is provided and is similar to control system 100 illustrated in FIG. 3. Finally, cooking area temperature sensing probes 822, 825, 827, 829 are provided for sensing the temperature in each of the zones 824-830 defined by the infrared heating elements. Although four separate zones have been illustrated in the oven of FIG. 17, one skilled in the art will appreciate that a greater or lesser number zones may be used depending upon the types of food products being cooked and the throughput and control requirements.

The temperature of the infrared panels is controlled by oven control circuitry 818 using feedback from the temperature probes in the panels. This system results in control of the infrared panel temperatures to as closer within a fraction of a degree. However, a problem occurs in conventional infrared ovens in that as a food product is heated by the infrared radiation, the food product gives off a quantity of moisture such that a cloud of water vapor develops above the food product. This concentration of water vapor severely degrades the ability of the infrared radiation to reach the food product. Consequently, food products may emerge from the oven 800 in a severely undercooked state if the oven has been loaded with a large number of food products. Thus, the increase in water vapor results in a decrease in the temperature of the oven near the food products.

Cooking area temperature sensing probes 822 may be platinum type devices. Probes 822 are each provided with a shield 823 which shield the probes from infrared energy arriving via line of sight. Therefore, probes 822 effectively sense the ambient temperature of the cooking area. The probes measure the cooking zone temperatures which vary as various loads pass through the zones.

As with the control circuitry illustrated in FIG. 3, after placing a pizza on the conveyor 806, the oven operator pushes a switch to indicate the type of food product that is entering the oven. As noted earlier, this operation can also be automated.

Figure 18:
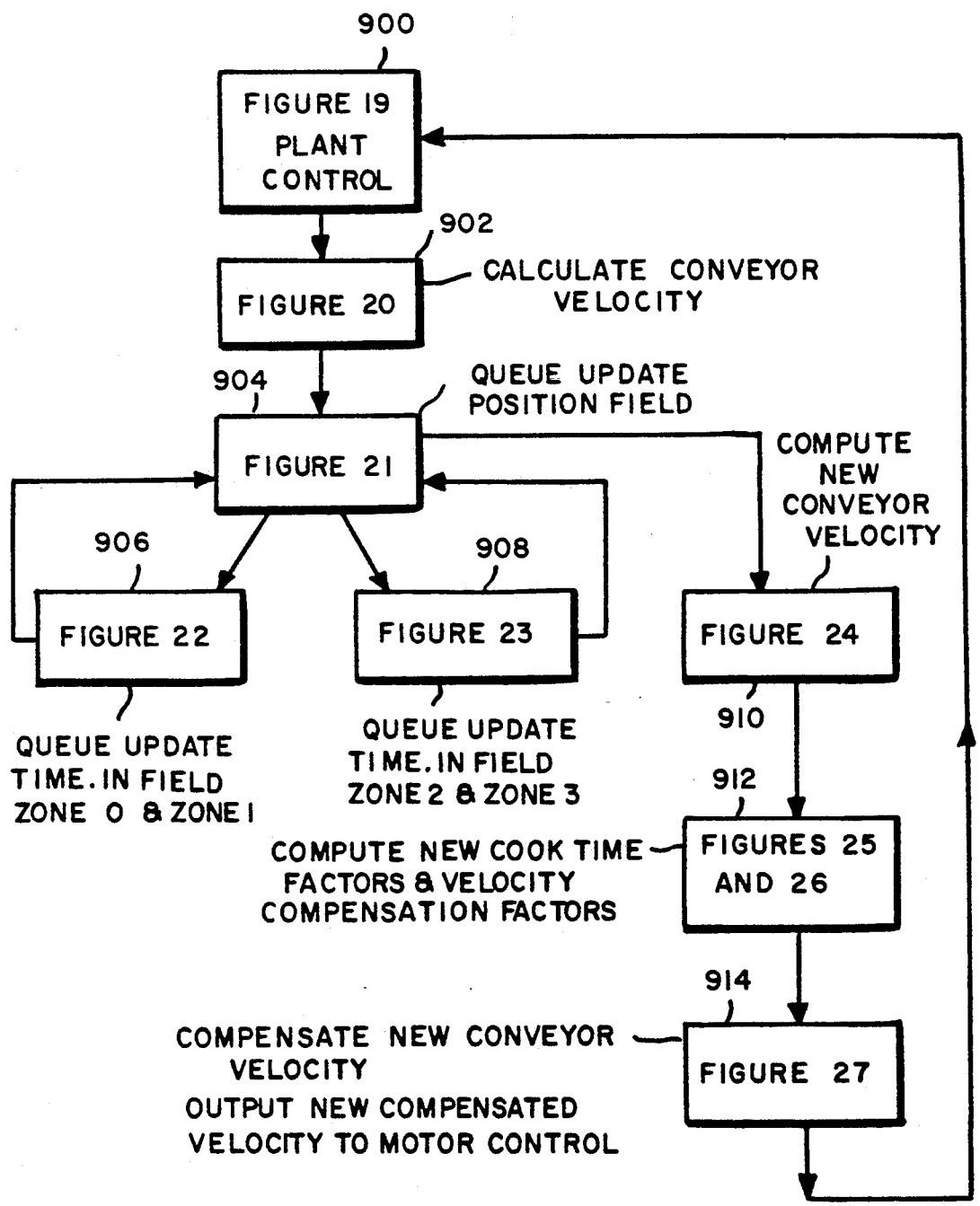
FIG. 18 is a schematic block diagram indicating the proper relationship of and processing carried out by flow chart 19-27.
Figure 19:
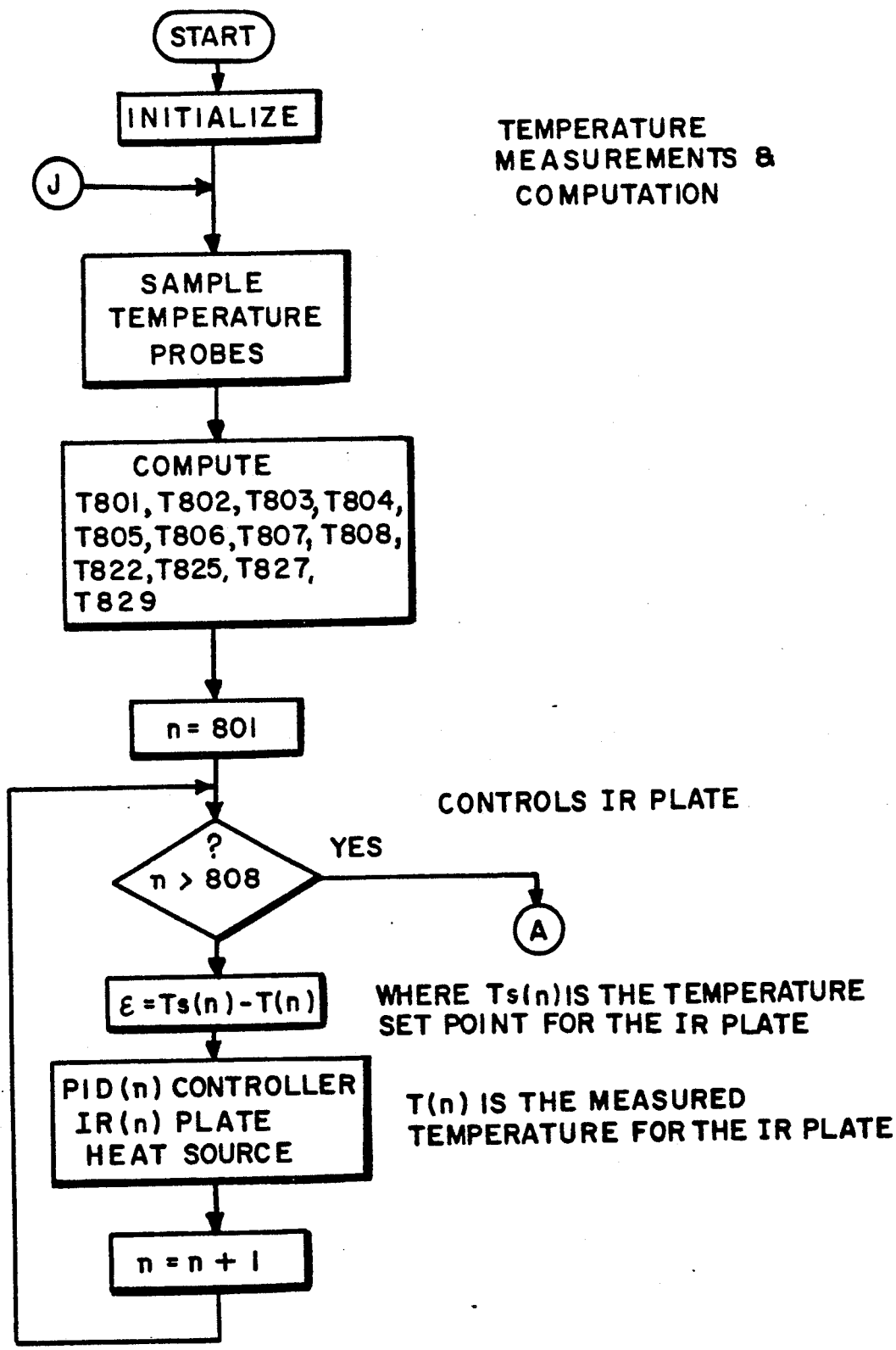
FIG. 19 is a flow chart illustrating the method of temperature control of the present invention carried out in the infrared oven of FIG. 17.

Reference is now made to FIG. 18 which figure illustrates an overview of the processing carried out in accordance with the present invention illustrated in FIGS. 19-27.

Portion 900 is a control block which controls the temperature of each of the zones 824, 826, 828 and 830 of the oven 800. The processing carried out by control block 900 is more clearly illustrated in FIG. 19. This processing is similar to the processing steps described in conjunction with FIG. 9.

Figures 20, 26:
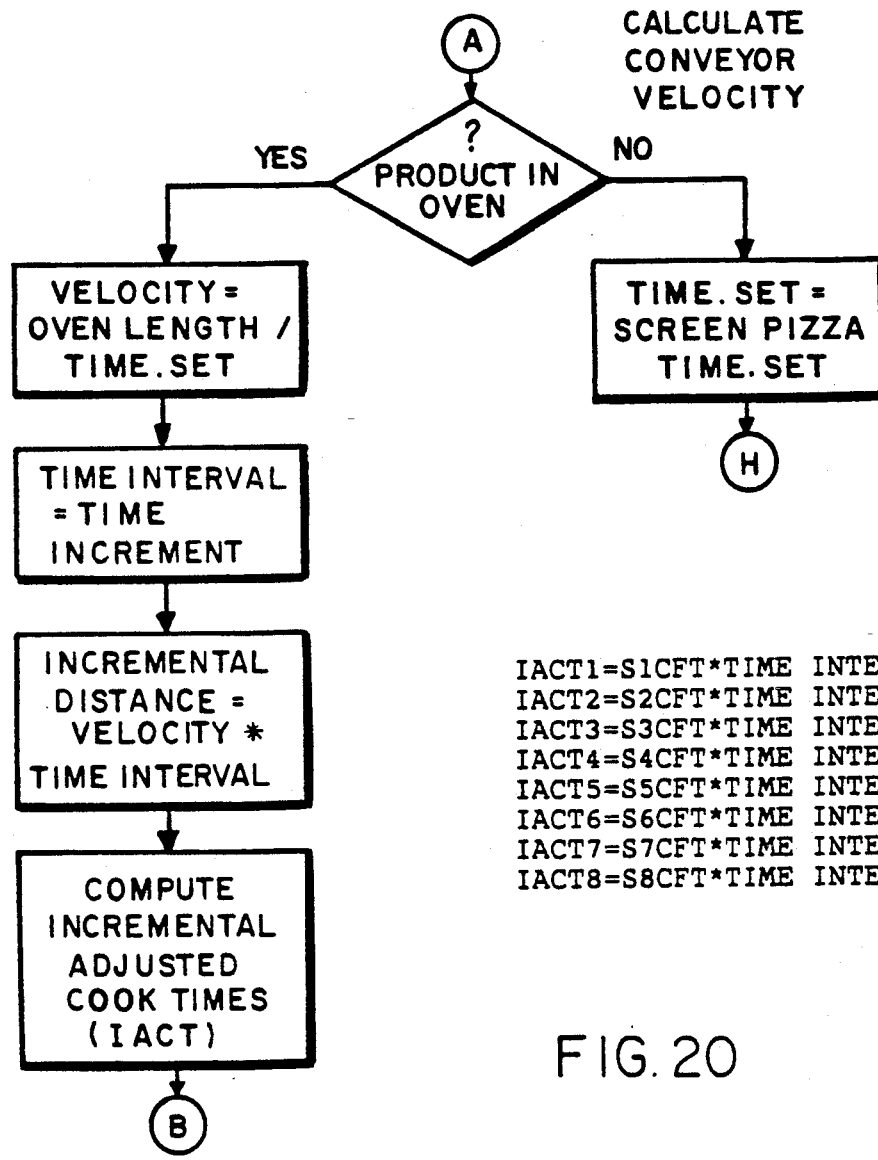

From control block 900, processing proceeds to control block 902. Control block 902 calculates the conveyor velocity and the incremental adjusted cook times. The processing carried out by control block 902 is illustrated in more detail in FIG. 20. The processing carried out in FIG. 20 is similar to the processing already described in connection with FIG. 10.

Figure 21:
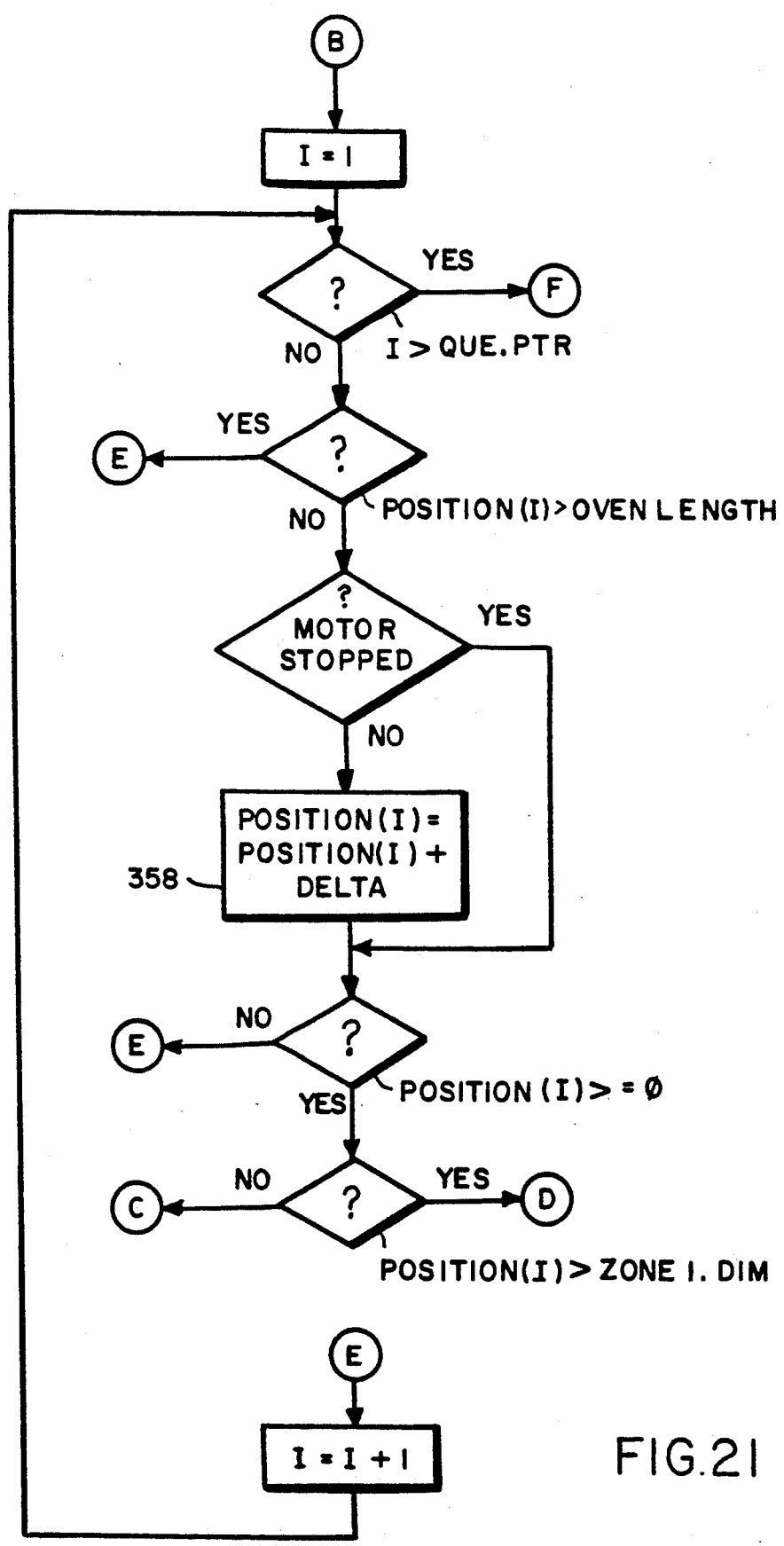
FIG. 21 is a flow chart illustrating the method of updating the queue element positions carried out in the infrared oven of FIG. 17.
Figure 22:
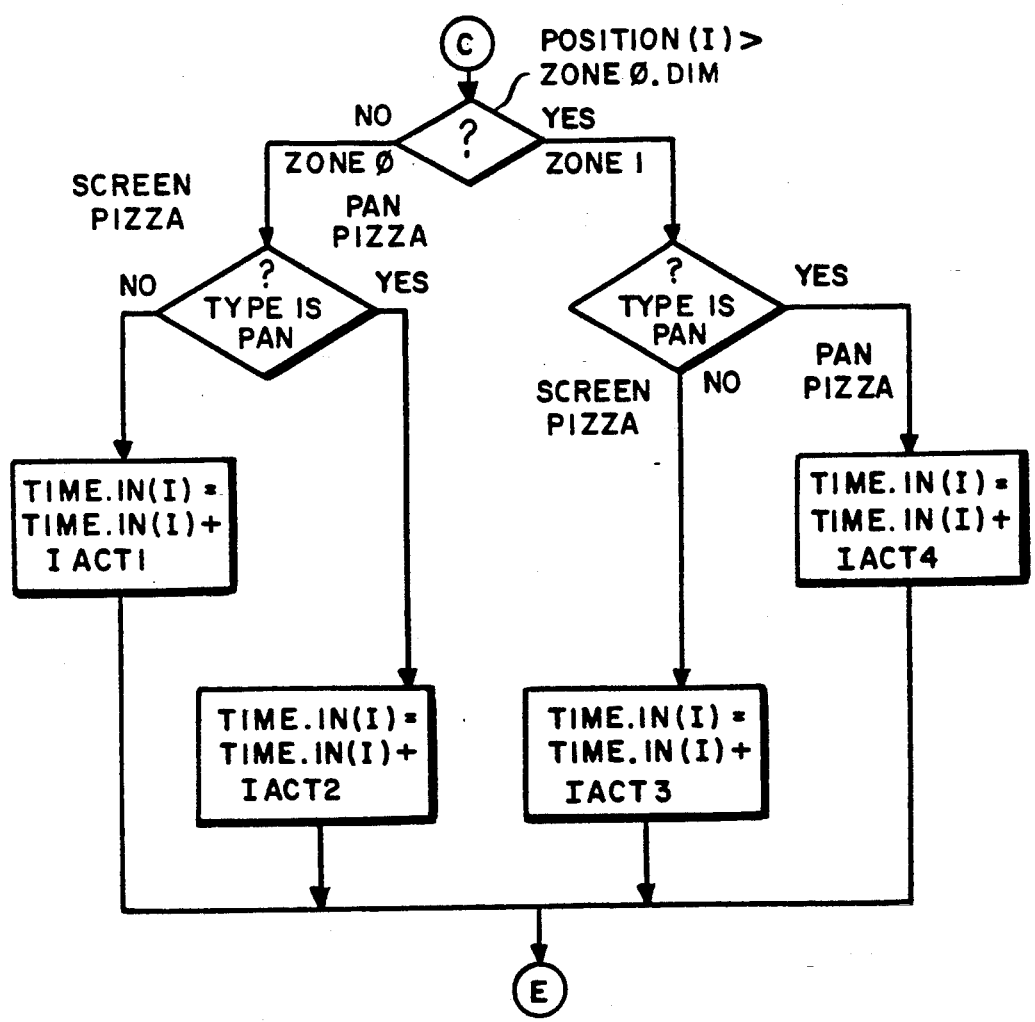
FIG. 22 is a flow chart illustrating the method of updating the total time for a queue element carried out in the infrared oven of FIG. 17 if the queue element is in zones 824 or 826.

From control block 902, the system proceeds to control block 904. Control block 904 carries out the processing necessary to determine and update the position field for each queue. The processing carried out by control block 904 is illustrated in more detail in FIG. 21. The processing illustrated in FIG. 21 is similar to the processing already described in connection with FIG. 11.

Figure 23:
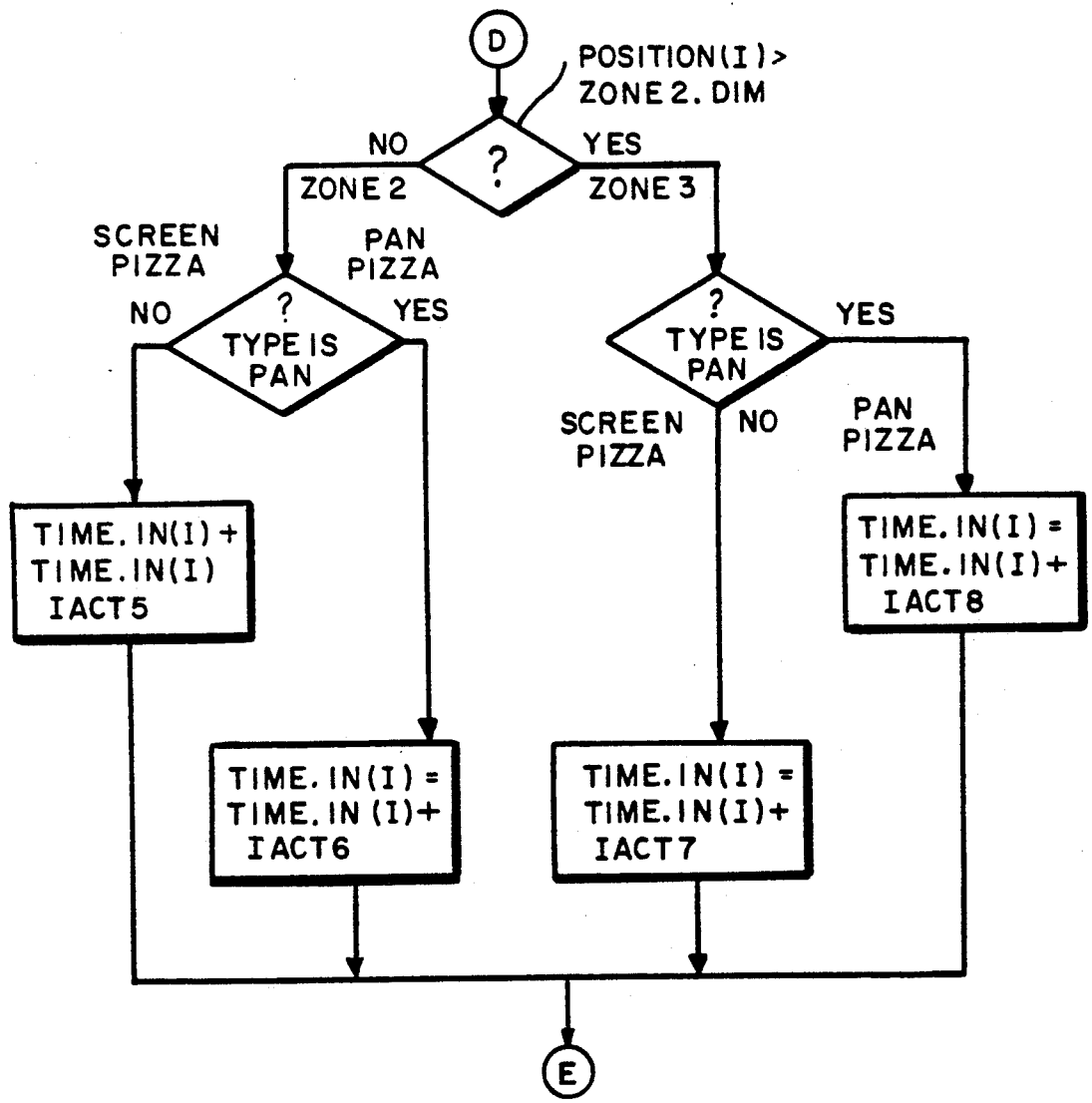
FIG. 23 is a flow chart illustrating the method of updating the total time for a queue carried out by the infrared oven of FIG. 17 if the queue element is in zones 828 or 830 of the oven.

From control block 904, processing proceeds to either control block 906 for 908. Control blocks 906 and 908 determine the total effective time that a queue element has been in the oven and update this value. Processing proceeds to control block 906 if the queue element to be updated is located in zone 824 or zone 826. On the other hand, processing proceeds to control block 908 if the queue element to be updated is located in zone 828 or zone 830. The processing carried out by control block 906 is illustrated in more detail in FIG. 22. This processing is similar to the processing already described in connection with FIG. 12. The processing performed by control block 908 is described in more detail in FIG. 23. The processing steps illustrated in FIG. 23 are similar to the processing already described in connection with FIG. 13.

From FIGS. 19-22, one skilled in the art will appreciate that the present invention can control an unlimited number of zones for temperature. The number of zones to be controlled is limited solely by the degree of accuracy desired for a given oven length.

Figure 24:
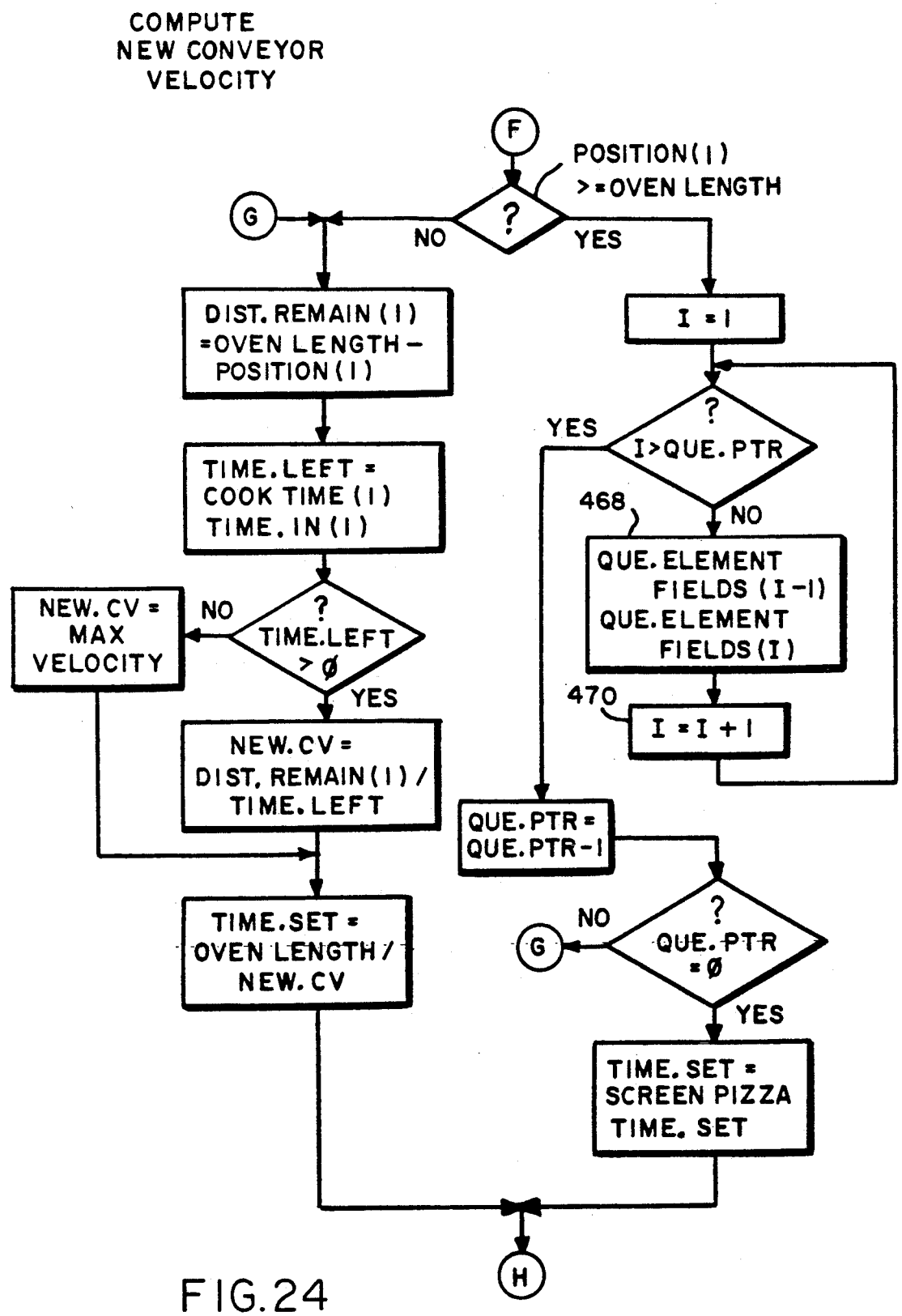
FIG. 24 is a flow chart illustrating the method for computing a new conveyor velocity carried out in the infrared oven of FIG. 17.

Once all of the total times and positions of the queue elements have been updated, processing proceeds from control block 904 to control block 910. Control block 910 carries out the portion of the processing which computes a new conveyor velocity as a function of the total effective cook time that the leading queue element I has been in the oven where $I=1$ indicates at the leading queue element. The processing details carried out by control block 910 are illustrated in more detail in FIG. 24. The processing steps illustrated in FIG. 24 are similar to the processing steps already described in connection with FIG. 14.

From control block 910, processing proceeds to control block 912. The processing carried out by control block 912 computes new cook time factors and new conveyor velocity compensation factors based on previously calculated conveyor speed and set time values. The values calculated by control block 912 are additionally used for calculation of the incremental adjusted cook time by control block 902 when the program make the next succeeding pass during the next sampling interval. The processing steps carried out by control block 912 are illustrated in more detail in FIG. 25 and 26. The processing steps illustrated in FIGS. 25 and 26 are similar to the processing already described in connection with FIG. 15.

Figure 27:
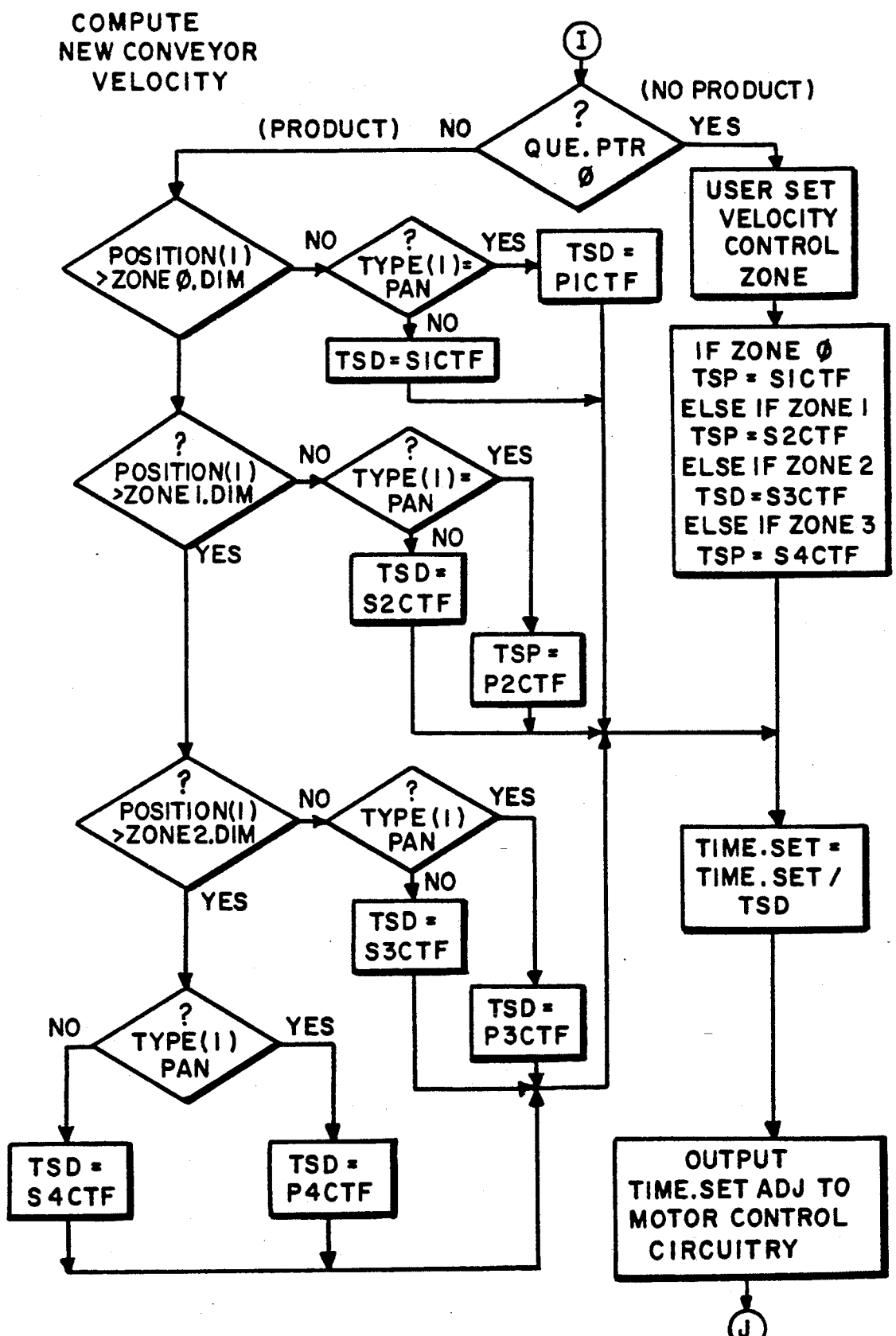
FIG. 27 is a flow chart illustrating the method for computing a new conveyor velocity carried out by the oven and control system of FIG. 17.

From control block 912, processing proceeds to control block 914. Control block 914 adjusts the set time based on the cook time factors previously calculated. Processing block 914 compensates the new conveyor velocity and outputs the new compensated velocity to the motor control. The processing steps carried out by control block 914 are illustrated in more detail in FIG. 27. The processing steps illustrated in FIG. 27 are similar to those already described in connection with FIG. 16.

The present invention provides numerous advantages over previous ovens and oven control systems. For example, in the situation where a screen pizza having a shorter cooking time is placed directly behind a pan pizza having a longer cooking time, the present invention is able to deliver both pizzas properly cooked within an acceptable tolerance. In previous systems, since the pan pizza requires a longer cooking time, and the conveyor velocity would not be varied, the screen pizza would end up staying in the oven too long and thus be overdone when emerged. However, in the present invention, since the conveyor is controlled so as to move any portion of a product which is done, or has reached the preprogrammed cooked state to the exit of the oven, as soon as the pan pizza is moved out of the oven cavity, the control system of the present invention will speed up the conveyor to its maximum velocity. Thus, causing the screen pizza to exit from the oven before it is unacceptably overcooked.

Additionally, in any type of conveyor oven, the integration of the cooking rate can be controlled by using a different weighted average than the weighted average used for controlling the temperature of the oven. These two values are independent and therefore the present invention allows for considerably greater flexibility when controlling the temperature of the oven and the cooking rate of the products.

Additionally, in the present invention, control follows the leading element of the product through the oven. Thus, the situation will never arise in which a product emerges from the oven overcooked or undercooked due to temperature control located in a remote part of the oven.

The control system of the present invention is able to achieve higher throughput than prior art systems while still maintaining consistency of the finished product. The control system of the present invention is able to cook products at temperatures above and below their ideal cooking temperature because it is able to adjust the time a product spends in the oven as a function of changes in oven temperature.

In its broadest sense then, the present invention allows the cooking time of a product to follow fluctuations in oven temperature due to factors such as variations in the heat source temperature, and variations in the thermal load placed in the oven, so that the total effective cooking time that a product remains in the oven is always within an acceptable tolerance.

Having thus described one particular embodiment of the invention, various alterations, modifications, and improvements will readily occur to those skilled in the art. For example, one skilled in the art will appreciate that the control system of the present invention is generic enough to be applied to any process where the total integrated time a product has been in the oven must be carefully regulated as a function of oven temperature in order that the product be at a desired "cooked" state when the product exits the oven. Thus, the present invention is applicable to processes other than cooking of food products. For example, the control system of the present invention may be used to control ovens in which heat treating operations are performed or ovens in which annealing operations are performed. Such alterations, modifications, and improvements as are made obvious by this disclosure are intended to be part of this disclosure though not expressly stated herein and are intended to be within the spirit and scope of the invention. Accordingly, the foregoing description is by way of example only and is not intended as limiting. The invention is limited only as defined in the following claims and equivalents thereto.

What is claimed is:

1. Apparatus for processing products in an oven, wherein processing includes changing or maintaining an energy content of the product, comprising:
    means for heating the oven to a temperature;
    means for conveying products through the oven at variable velocities;
    means for sensing the temperature of the oven;
    means for establishing initial conditions including means for establishing a set temperature and means for establishing a product processing time;
    means, responsive to the temperature sensing means for determining an effective processing time for a product at intervals, wherein the effective processing time is a function of the sensed temperature and a sensitivity of processing time to changes in oven temperature for the product;

means for determining, at each of the intervals, a total effective processing time by summing each of the effective processing times determined at each interval; and means for controlling a velocity of the means for conveying including means responsive to a difference between the total effective processing time and an actual elapsed processing time that the product has been in the oven for adjusting the velocity of the means for conveying so that the product exits the oven when the total effective processing time equals the product processing time.

2. The apparatus of claim 1, wherein the means for controlling increases the velocity of the means for conveying if the total effective processing time is greater than the actual elapsed processing time and decreases the velocity of the means for conveying if the total effective processing time is less than the actual elapsed processing time.

3. A method for processing products in an oven, wherein processing includes changing or maintaining an energy content of the product, comprising the steps of:
heating the oven to a temperature;
conveying products through the oven at variable velocities;
sensing the temperature of the oven;
establishing initial conditions including a set temperature and a product processing time;
determining an effective processing time for a product at intervals, wherein the effective processing time is a function of the sensed temperature and a sensitivity of processing time to changes in oven temperature for the product;
determining, at each of the intervals, a total effective processing time by summing each of the effective processing times determined at each interval; and
controlling a velocity of the product through the oven in response to a difference between the total effective processing time and an actual elapsed processing time that the product has been in the oven so that the product exits the oven when the total effective processing time equals the product processing time.

4. The apparatus of claim 3, wherein the means for determining the sensitivity of processing time to changes in oven temperature is described by a processing curve defining a relationship between oven temperature and product processing time.

5. The apparatus of claim 4, wherein the oven further comprises a heat source means and means for controlling the heat source.

6. The apparatus of claim 5, wherein the means for sensing the temperature of the oven further comprises a plurality of temperature probe means.

7. The apparatus of claim 6, further comprising means for combining temperatures sensed by the plurality of temperature probe means into a final sensed oven temperature.

8. The apparatus of claim 7, wherein the means for combining includes means for weighting temperatures sensed by each of the temperature probe means.

9. The method of claim 3, wherein the step of controlling a velocity of the product through the oven includes increasing the velocity if the total processing time is greater than the actual elapsed processing time and decreasing the velocity if the total effective processing time is less than the actual elapsed processing time.

10. The method of claim 9, wherein the sensitivity of processing time to changes in oven temperature is described by a processing curve defining a relationship between oven temperature and product processing time.

11. The method of claim 10, wherein the step of sensing the temperature of the oven comprises sensing the temperature at a plurality of locations in the oven.

12. The method of claim 11, further comprising the step of combining the temperatures from the plurality of locations into a final sensed oven temperature.

13. The method of claim 12, further comprising the step of weighting the temperatures sensed at the plurality of locations when combining the temperatures into the final sensed oven temperature.

14. The method of claim 13, wherein the step of weighting the temperatures includes weighting the temperatures according to the relationship:

$$T = (T_a)(W) + (T_b)(1-W)$$

where
$T$ = the average temperature of a predetermined zone
$T_a$ = the temperature measured by a zone temperature probe
$T_b$ = the temperature measured by another zone temperature probe
$W$ = an empirically determined zone weighting factor.

15. The method of claim 10, wherein the processing curve is defined by the relationship:

$$K = (T)(t^n)$$

where
$n = 1$
$t$ = actual measured processing time (in appropriate units)
$T$ = actual measured oven temperature (in appropriate units)

$$K = (T_s)(t_s)$$

where
$T_s$ = the set temperature
$t_s$ = the product processing time.

16. The method of claim 15, further comprising the step of defining a processing curve for each product that is to be processed in the oven.

17. The method of claim 16, further comprising the step of establishing a set point coinciding with the set temperature and the product processing time and defining the processing curve for each product to be processed in the oven so that the set point lies on the processing curve for each product.

18. The method of claim 17, further comprising the step of determining a processing rate curve defining a relationship between a derivative of any point on the processing curve with respect to temperature and a derivative of the set point on the processing curve with respect to temperature.

19. The method of claim 3, further comprising the step of heating the oven to the set temperature and maintaining the oven at the set temperature.

20. Apparatus for cooling food products in an oven, comprising:

a conveyor for moving food products through the oven at variable velocities;

a heater for heating the oven to a temperature;

a temperature sensor for sensing the temperature of the oven;

an oven controller for establishing initial conditions including a set temperature and a food product cooking time;

a calculator, responsive to the temperature sensed by the temperature sensor, for determining an effective cooking time for a food product at intervals, wherein the effective cooking time is a function of the sensed temperature and a sensitivity of cooking time to changes in oven temperature for the food product;

an integrator for determining, at each of the intervals, a total effective cooking time by summing each of the effective cooking times determined at each interval; and a conveyor velocity controller for adjusting a velocity of the conveyor as a function of a difference between the total effective cooking time and an actual elapsed time that the food product has been in the oven, the conveyor velocity controller adjusting the velocity of the conveyor so that the food product exits the oven when the total effective cooking time equals the food product cooking time.

* * * * *